(12) United States Patent
Chiu et al.

(10) Patent No.: US 10,558,679 B2
(45) Date of Patent: Feb. 11, 2020

(54) SYSTEMS AND METHODS FOR PRESENTING A TOPIC-CENTRIC VISUALIZATION OF COLLABORATION DATA

(71) Applicant: FUJI XEROX CO., LTD., Tokyo (JP)

(72) Inventors: Patrick Chiu, Mountain View, CA (US); Francine R. Chen, Menlo Park, CA (US)

(73) Assignee: FUJI XEROX CO., LTD., Tokyo (JP)

( * ) Notice: Subject to any disclaimer, the term of this patent is extended or adjusted under 35 U.S.C. 154(b) by 900 days.

(21) Appl. No.: 15/040,972

(22) Filed: Feb. 10, 2016

(65) Prior Publication Data

US 2017/0228445 A1 Aug. 10, 2017

(51) Int. Cl.
*G06F 3/00* (2006.01)
*G06F 16/25* (2019.01)
*G06F 16/248* (2019.01)
*G06F 16/2457* (2019.01)
*G06F 3/0481* (2013.01)
*G06F 3/048* (2013.01)

(52) U.S. Cl.
CPC .............. *G06F 16/25* (2019.01); *G06F 3/048* (2013.01); *G06F 3/0481* (2013.01); *G06F 16/248* (2019.01); *G06F 16/24578* (2019.01)

(58) Field of Classification Search
CPC ...................................................... G06F 3/048
See application file for complete search history.

(56) References Cited

U.S. PATENT DOCUMENTS

| | | | | |
|---|---|---|---|---|
| 5,765,177 A | * | 6/1998 | Nakatsuyama | G06F 17/218 715/209 |
| 5,920,879 A | * | 7/1999 | Kyojima | G06F 17/227 715/210 |
| 5,956,726 A | * | 9/1999 | Aoyama | G06F 17/2211 707/755 |
| 6,154,213 A | * | 11/2000 | Rennison | G06F 17/30716 345/428 |
| 6,812,941 B1 | * | 11/2004 | Brown | G06F 9/451 715/854 |

(Continued)

*Primary Examiner* — Kieu D Vu
*Assistant Examiner* — Andrew Chung
(74) *Attorney, Agent, or Firm* — Morgan, Lewis & Bockius LLP

(57) ABSTRACT

Systems and methods disclosed herein present topic-centric visualizations of collaboration data. An example method includes: obtaining a set of topics based on an analysis of collaboration data and displaying an interactive visualization that includes first UI elements that correspond to each topic (first UI elements corresponding to similar topics are positioned close together). In response to receiving a specified time period for the interactive visualization, the method includes: identifying a subset of the plurality of persons that are associated with the specified time period. The method additionally includes: obtaining a first set of connections between the set of topics and the subset and a second set of connections between related persons in the subset. The method further includes: updating the interactive visualization to include second UI elements corresponding to each respective person of the subset and visual representations of each connection in the first and second sets.

19 Claims, 14 Drawing Sheets
(8 of 14 Drawing Sheet(s) Filed in Color)

(56) References Cited

U.S. PATENT DOCUMENTS

| | | | | |
|---|---|---|---|---|
| 7,694,226 B2* | 4/2010 | Covannon | G06F 17/24 | 707/608 |
| 7,966,345 B1* | 6/2011 | Funston | G06F 17/5027 | 707/792 |
| 7,970,771 B2* | 6/2011 | Rasmussen | G06Q 10/10 | 707/748 |
| 8,915,511 B2* | 12/2014 | Brown | B62K 7/02 | 280/281.1 |
| 9,201,905 B1* | 12/2015 | Kelsey | G06F 17/30283 | |
| 9,965,521 B1* | 5/2018 | Goel | G06F 17/3053 | |
| 2003/0121008 A1* | 6/2003 | Tischer | G06F 17/2247 | 715/255 |
| 2006/0015809 A1* | 1/2006 | Hattori | G06F 17/30929 | 715/255 |
| 2006/0101320 A1* | 5/2006 | Dodds | G06F 17/30569 | 715/239 |
| 2009/0327921 A1* | 12/2009 | Holm-Peterson | G06F 16/219 | 715/753 |
| 2010/0106752 A1* | 4/2010 | Eckardt, III | G06F 17/30696 | 707/805 |
| 2010/0185609 A1* | 7/2010 | Wright | G06T 11/206 | 707/724 |
| 2010/0185984 A1* | 7/2010 | Wright | G06T 11/206 | 715/833 |
| 2010/0205541 A1* | 8/2010 | Rapaport | G06Q 10/10 | 715/753 |
| 2012/0005570 A1* | 1/2012 | Hughes | G06F 17/2247 | 715/234 |
| 2012/0272160 A1* | 10/2012 | Spivack | G06Q 10/10 | 715/752 |
| 2012/0290950 A1* | 11/2012 | Rapaport | H04L 51/32 | 715/753 |
| 2013/0091465 A1* | 4/2013 | Kikin-Gil | G06F 3/0485 | 715/817 |
| 2013/0155068 A1* | 6/2013 | Bier | G06Q 10/10 | 345/440 |
| 2014/0115436 A1* | 4/2014 | Beaver | G06F 17/2288 | 715/229 |
| 2014/0173425 A1* | 6/2014 | Hailpern | G06F 17/24 | 715/256 |
| 2014/0244531 A1* | 8/2014 | Baldwin | G06Q 10/1053 | 705/319 |
| 2015/0072330 A1* | 3/2015 | Rosenberg | G09B 5/02 | 434/319 |
| 2015/0089399 A1* | 3/2015 | Megill | H04L 12/1813 | 715/753 |
| 2015/0120714 A1* | 4/2015 | Xu | G06Q 50/01 | 707/723 |
| 2015/0142888 A1* | 5/2015 | Browning | H04L 12/1831 | 709/204 |
| 2015/0195176 A1* | 7/2015 | Vasseur | H04L 43/12 | 709/224 |
| 2015/0254214 A1* | 9/2015 | Rosenberg | G09B 5/06 | 715/202 |
| 2015/0309685 A1* | 10/2015 | Savage | G06F 17/30707 | 715/763 |
| 2016/0267166 A1* | 9/2016 | Kohlmeier | G06F 17/30312 | |
| 2017/0221090 A1* | 8/2017 | Li | G06Q 30/0244 | |

* cited by examiner

SYSTEMS AND METHODS FOR PRESENTING A TOPIC-CENTRIC VISUALIZATION OF COLLABORATION DATA

TECHNICAL FIELD

The present application is generally related to creating and presenting visualizations of collaboration data and, more specifically, to presenting a topic-centric visualization of collaboration data.

BACKGROUND

Visualizing collaboration data helps users to identify important contributors with expertise in various areas of interest. Some techniques use publication venues to represent areas of interest and, thus, datasets that are associated with a single venue or datasets that do not have well-defined venues cannot take full advantage of these techniques. Additionally, these techniques produce cluttered visualizations for datasets that include many venues or people, thus reducing the usefulness of these visualizations.

Therefore, there is a need for implementations that address these deficiencies in order to produce clear visualizations (e.g., less cluttered visualizations) that work with many types of datasets.

SUMMARY

Various implementations of systems, methods, and devices within the scope of the appended claims each have several aspects, no single one of which is solely responsible for the attributes described herein. Without limiting the scope of the appended claims, after considering this disclosure, and particularly after considering the section entitled "Description of Implementations" one will understand how the aspects of various implementations are used to enable computing devices to present topic-centric visualizations of collaboration data.

Disclosed implementations provide methods for presenting topic-centric visualizations of collaboration data. In general, the disclosed implementations efficiently mine any dataset (e.g., collection of documents, document metadata, or other sets of collaboration data) to present a clear visualization of a respective dataset. In some implementations, topic modeling is used to enable a user to visualize collaborations and topics over time. Topics and publication venues are similar in the way that they help define areas of interest for underlying documents and collaborations through co-authorship. One advantage of using topic modeling is that visualizations can be created even when venues are not well-defined, or when there are too few or too many venues. Furthermore, topic modeling enables filtering nodes by relevance, which also helps to create less cluttered visualizations. This allows larger datasets to be handled. Unlike with simple venue metadata, topic modeling provides a vector space of terms which has a natural way to compute relevance (i.e. cosine similarity). Using the LDA model (e.g., LDA algorithm of Blei, D. M., Ng, A. Y., Jordan, M. I. Latent Dirichlet allocation. J. of Machine Learning Research, 3 (4-5): 993-1022 (2003), which is herein incorporated by reference in its entirety), each topic is represented by a set of terms and their associated probabilities. In some implementations, topics provide good coverage of the space of documents and people in any dataset, so that nodes in the visualization can be filtered effectively by varying relevance thresholds. The topic model vector space also provides a good way to layout the topic nodes in the visualization. The topics in the high dimensional vector space of terms can be mapped to a 2D plane by multidimensional scaling (MDS), based on the similarity scores between topics. For people who analyze data, it is important to be able to see sudden surges in activity level. To visualize the changing popularity for the various topics over different time spans, a burst detection algorithm is applied to the activity stream of each topic. The topic nodes change colors to indicate different "heat" levels as a timeline slider is manipulated.

In one aspect, a process is performed by a computing device (e.g., a local computing device, such as a user's laptop, mobile phone, and the like, or a remote computing device such as a server) and the process is used to present topic-centric visualizations of collaboration data that is associated with a plurality of persons. The process includes: obtaining a set of topics based on an analysis of the collaboration data and displaying, on a display of the computing device, an interactive visualization that includes first user interface elements that correspond to each topic in the set of topics. The first user interface elements are positioned on the display such that first user interface elements corresponding to similar topics are close together. The process also includes: receiving, via one or more input devices of the computing device, a user selection of a specified time period for the interactive visualization. In response to receiving the user selection of the specified time period, the process includes: identifying a subset of the plurality of persons that are associated with the specified time period. The process further includes: obtaining (a) a first set of connections between the set of topics and the subset of the plurality of persons, each connection in the first set of connections is associated with a person-topic similarity score that indicates similarity of a respective person of the subset of the plurality of persons to a respective topic in the set of topics during the specified time period and (b) a second set of connections between related persons in the subset of the plurality of persons, each connection in the second set of connections is associated with a person-person similarity score that indicates similarity of a respective related person of the related persons to a different respective related person of the related persons during the specified time period. The process additionally includes: displaying second user interface elements that correspond to each person in the subset of the plurality of persons. For each connection in the first set of connections and the second set of connections, the process includes: updating the interactive visualization to include a visual representation of the respective connection.

In accordance with some implementations of the processes described above, the set of topics are identified based on an analysis of information about the collaboration data, and the collaboration data is not displayed in the interactive visualization (i.e., only topics and their relationships with the plurality of persons are displayed, no individual documents are displayed).

In accordance with some implementations of the processes described above, the displayed interactive visualization further includes: a respective burst activity indication for each topic of the set of topics. The respective burst activity indication for a respective topic provides a visual representation of the intensity level of document creation that is associated with the respective topic during the specified time period. In some implementations, burst detection is computed for each topic in the set of topics (e.g., for each topic of the set of topics, a number of relevant documents is found for each time point to generate an activity stream). A burst detection algorithm is then applied to the activity stream of each topic and, for each time point of a topic, a burst level is assigned (e.g., 0, 1, 2, 3). In some implementations, the burst levels are mapped to different "heat" colors in the interactive visualization (e.g., 0:green, 1:yellow, 2:orange, and 3:red, as shown for respective topic nodes in FIGS. 4A-4B and 5A-5C). In some implementations, a burst is defined as a topic having more than a threshold amount of associated documents/persons for a particular time period. Example burst activity indications are shown in FIGS. 4A-4B as graphics within each of the topic nodes (in some implementations, a size of the burst activity indication graphic reflects the number of relevant documents for a topic node during the selected time period).

In accordance with some implementations of the processes described above, a respective first user interface element for a respective topic is displayed with: (i) an identifier (e.g., a unique numerical identifier or a unique identifier containing at least one alpha-numeric or symbolic character) and (ii) a predefined number (e.g., 3, 4, 5, or more) of topic component terms that are associated with the respective topic.

In accordance with some implementations of the processes described above, the identifier is an editable field and the process further includes: detecting a selection of the identifier for the respective first user interface element. In response to detecting the selection of the identifier, the process includes: allowing a user to input a descriptive name for the respective topic. In some implementations, after user inputs the descriptive name, that descriptive name is displayed within the interactive visualization instead of the identifier.

In accordance with some implementations of the processes described above, the process further includes: receiving a new user selection, via the one or more input devices, to display the interactive visualization for a new time period, distinct from the specified time period. In response to receiving the new request, determining that a respective connection in the first set of connections is associated with an updated person-topic similarity score that is specific to the new time period. The updated person-topic similarity score is distinct from a respective person-topic similarity score that is associated with the respective connection during the specified time period (i.e., the updated relevance score is either greater than or less than the originally-computed similarity score, indicating that the interactive visualization should be updated to reflect this change). The process also includes: moving a respective second user interface element to a new position on the display and updating a respective visual representation of the respective connection based on the new position.

In accordance with some implementations of the processes described above, updating the interactive visualization does not include modifying display positions for the first user interface elements corresponding to each topic in the set of topics. Stated another way, nodes for the topics (first user interface elements) are fixed and thus do not move in the visualization, even as the nodes corresponding to the persons (second user interface elements) do move.

In accordance with some implementations of the processes described above, the new user selection to display the interactive visualization for the new time period is received at a slide-able user interface element (e.g., using a timeline slider, timeline, time dial, or the like).

In accordance with some implementations of the processes described above, the collaboration data includes freely-available metadata about a plurality of documents.

In accordance with some implementations of the processes described above, the freely-available metadata about the plurality of documents includes, for a respective document of the plurality of documents, author information, a document abstract, a date of publication, a document title, and metadata keywords.

In accordance with some implementations of the processes described above, the plurality of persons are authors of a plurality of documents included in the collaboration data and each connection in the second set of connections between related persons indicates a relationship between co-authors.

In accordance with some implementations of the processes described above, visual representations of each connection in the first set of connections are displayed in a visually distinct manner within the interactive visualization relative to visual representations of each connection in the second set of connections (e.g., connections between persons and topics are in a first color and additional connections between persons and other persons (co-authors) are displayed in a second color that is distinct from the first color).

In accordance with some implementations of the processes described above, the process further includes: receiving a user selection of a respective second user interface element that is associated with a respective person of the plurality of persons and, in response to receiving the user selection, displaying links to collaboration data that is associated with the respective person. In this way, users can quickly access documents associated with particular authors, even though the interactive visualization does not display the documents directly in the visualization.

In accordance with some implementations of the processes described above, the person-topic similarity scores are generated using (i.e., computed based on the output of) an LDA-based model.

In accordance with some implementations of the processes described above, displaying a respective second user interface element for a respective person includes, in accordance with a determination that at least one assigned person-topic similarity score that is associated with the respective person satisfies a person-topic similarity threshold, updating the interactive visualization to include the second user interface element.

In accordance with some implementations of the processes described above, updating the interactive visualization to include a visual representation of a respective connection in the first set of connections includes, in accordance with a determination that an assigned person-topic similarity score that is associated with the respective connection satisfies a person-topic similarity threshold, updating the interactive visualization to include the visual representation of the respective connection.

In accordance with some implementations of the processes described above, updating the interactive visualization to include a visual representation of a respective connection in the second set of connections includes, in accordance with a determination that an assigned person-person similarity score that is associated with the respective connection satisfies a person-person similarity threshold, updating the interactive visualization to include the visual representation of the respective connection.

In accordance with some implementations of the processes described above, the process further includes: receiving a user query; identifying a subset of the collaboration data as being responsive to the query; and updating display of the interactive visualization to present only topics and persons associated with the subset of the collaboration data.

In accordance with some implementations of the processes described above, a respective second user interface element is positioned on the display based on person-topic and person-person similarity scores that are associated with the respective second user interface element. In some implementations, the respective second user interface element is positioned near to similar topics and to similar persons. For example, as shown in FIG. 4B, person node 404-C is positioned near topic node "[9] similarity audio discourse" because "David Ahn" is similar to that topic (based on the person-topic similarity score that is associated with person-topic connection 408-C between the person node 404-C for "David Ahn" and the topic node "[9] similarity audio discourse"). Additionally, person node 404-C is located near person nodes for other people (e.g., "Christopher Culy") because person node 404-C is also similar to Christopher Culy (e.g., because Christopher Culy and David Ahn co-authored an article together that is related to topic node "[9] similarity audio discourse").

Some implementations apply the same techniques described herein to numerous diverse contexts. More generally, the disclosed techniques can be applied to find people with expertise in some topic area, people with broad interests across disciplines, and people who are recently active or who have had a large amount of experience over time. Other applications include helping management assess the balance of people working on various areas, and to see the impact of their policies on how their team members collaborate over time.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numerals refer to corresponding parts throughout the drawings.

DESCRIPTION OF IMPLEMENTATIONS

Reference will now be made in detail to various implementations, examples of which are illustrated in the accompanying drawings. In the following detailed description, numerous specific details are set forth in order to provide a thorough understanding of the invention and the described implementations. However, the invention may be practiced without these specific details. In other instances, well-known methods, procedures, components, and circuits have not been described in detail so as not to unnecessarily obscure aspects of the implementations.

Figure 1:
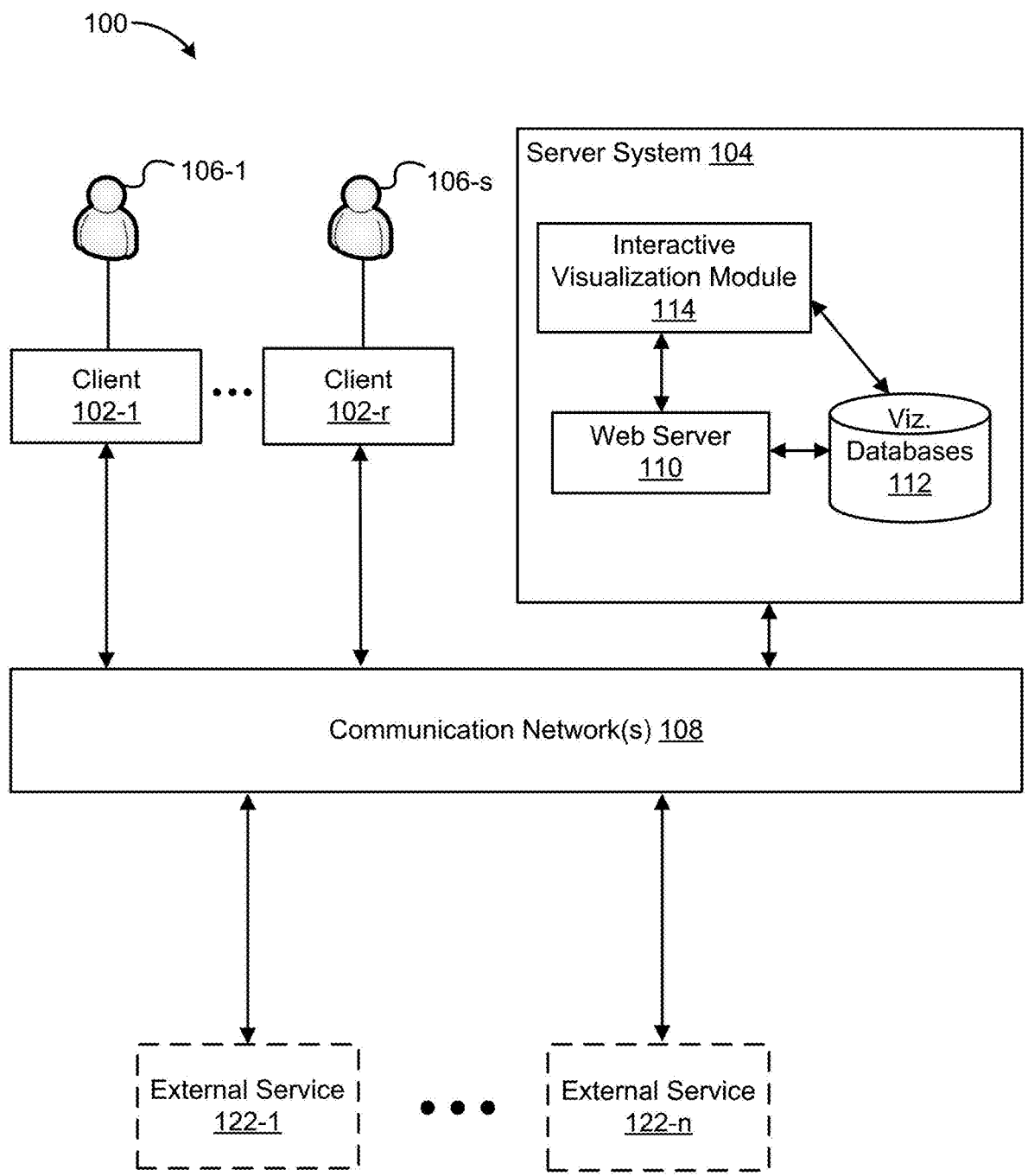
FIG. 1 is a block diagram illustrating a topic-centric visualization presentation system in accordance with some implementations.

FIG. 1 is a block diagram of a distributed system 100 including a visual detectors training module 114, which is part of a server system 104, according to some implementations. The distributed environment 100 includes one or more clients 102 (e.g., clients 102-1, . . . , 102-s), each operated by a respective user 106 (e.g., users 106-1, . . . , 106-s). There is not necessarily a one-to-one correspondence between the client devices 102 and the users 106. The server system 104 is interconnected with the clients 102 by one or more communication network(s) 108, such as the Internet.

A client 102 (sometimes called a "client device" or a "client computer" or a "computing device") may be any computer or similar device through which a user 106 of the client 102 can submit requests to and receive results or services from the server system 104. Examples of client devices include desktop computers, notebook computers, tablet computers, mobile phones, personal digital assistants, set-top boxes, or any combination of the above. A client 102 typically runs client applications 326, which can submit requests to the server system 104. For example, some clients include a web browser 324 or other type of application that permits a user 106 to search for, browse, and/or use resources (e.g., webpages and web services) accessed from the server system 104 over the communication network 108.

In some instances, a client device 102 is a mobile device, such as a laptop computer or a smart phone. Users 106 commonly use mobile devices 102 to execute web browsers, messaging, social media applications, and the like that interact with external services 122, such as DBLP computer science bibliography, Google Docs, IEEE Digital Library, PubMed, and other similar repositories hosting (or providing links to) collaboration data (e.g., articles published by a number of authors in a particular field or social media data contributed by a number of different users on a particular topic, or metadata describing the articles or the social media data). The server system 104 connects to the external services 122 to obtain collaboration data to use for presenting topic-centric visualizations of the collaboration data.

In some implementations, a client device 102 includes a local component (e.g., an application 326, FIG. 3), which works in conjunction with the interactive visualization module 114 at the server system 104 as components of an interactive visualization presentation system. In some implementations, the components are software applications for organizing and retrieving collaboration data from large-scale databases stored at the external services 122 or at the server system 104. In some implementations, the local component executes at a client 102, but in other implementations, the local component is part of the interactive visualization module 114 at the server system 104. In some implementations, the local component and the interactive visualization module 114 are implemented on separate servers in the server system 104.

The communication network 108 can be any wired or wireless local area network (LAN) and/or wide area network (WAN), such as an intranet, an extranet, the Internet, or a combination of such networks. In some implementations, the communication network 108 uses the HyperText Transport Protocol (HTTP) to transport information using the Transmission Control Protocol/Internet Protocol (TCP/IP). HTTP permits client computers to access various resources available via the communication network 108. The term "resource" as used throughout this specification refers to any piece of information and/or service that is accessible via a content location identifier (e.g., a URL) and can be, for example, a webpage, a document, a database, an image, a computational object, a search engine, or other online information service.

In some implementations, the server system 104 distributes information about collaboration data (e.g., metadata about a plurality of documents). In some implementations, the server system 104 includes many files or other data structures of various types, and those files or data structures include combinations of text, graphics, video, audio, digital photos, and other digital media files.

In some implementations, the server system 104 includes an interactive visualization module 114. The interactive visualization module 114 is an application (or combination of applications) that utilize(s) analyzes a large collection of collaboration data to present topic-centric visualizations of collaboration data. For example, the interactive visualization module 114 is configured to obtain topics using an LDA-based algorithm, determine connections between persons (such as co-authors of the collaboration data) and between persons and the obtained topics, determine similarity scores for each of the determined connections (and to determine activity burst indications for the determined topics), and present (e.g., by providing data to a client device, such as client device 102-1, FIG. 1) an interactive visualization showing the determined connections (or only those connections that satisfy certain similarity score thresholds). In some implementations, the interactive visualization is presented with a timeline slider (e.g., timeline slider 422, FIG. 4C) that allows a user to select a time period (e.g., selected time period 424, corresponding to the years 2003-2005) so that the user is able to view changes over time.

In some implementations, the server system 104 connects to the external services 122 and obtains information such as metadata about collaboration data that is gathered or maintained by the external services 122. The information obtained is then stored in the visualization database 112 (also referred to herein as database 112) on the server 104. In some implementations, the visualization database 112 stores collaboration data 230, set of topics 232, persons 234, person-person connections 236, person-topic connections 238, and other data. This data is used to present interactive visualizations of collaboration data (as discussed in more detail below).

Figure 2:
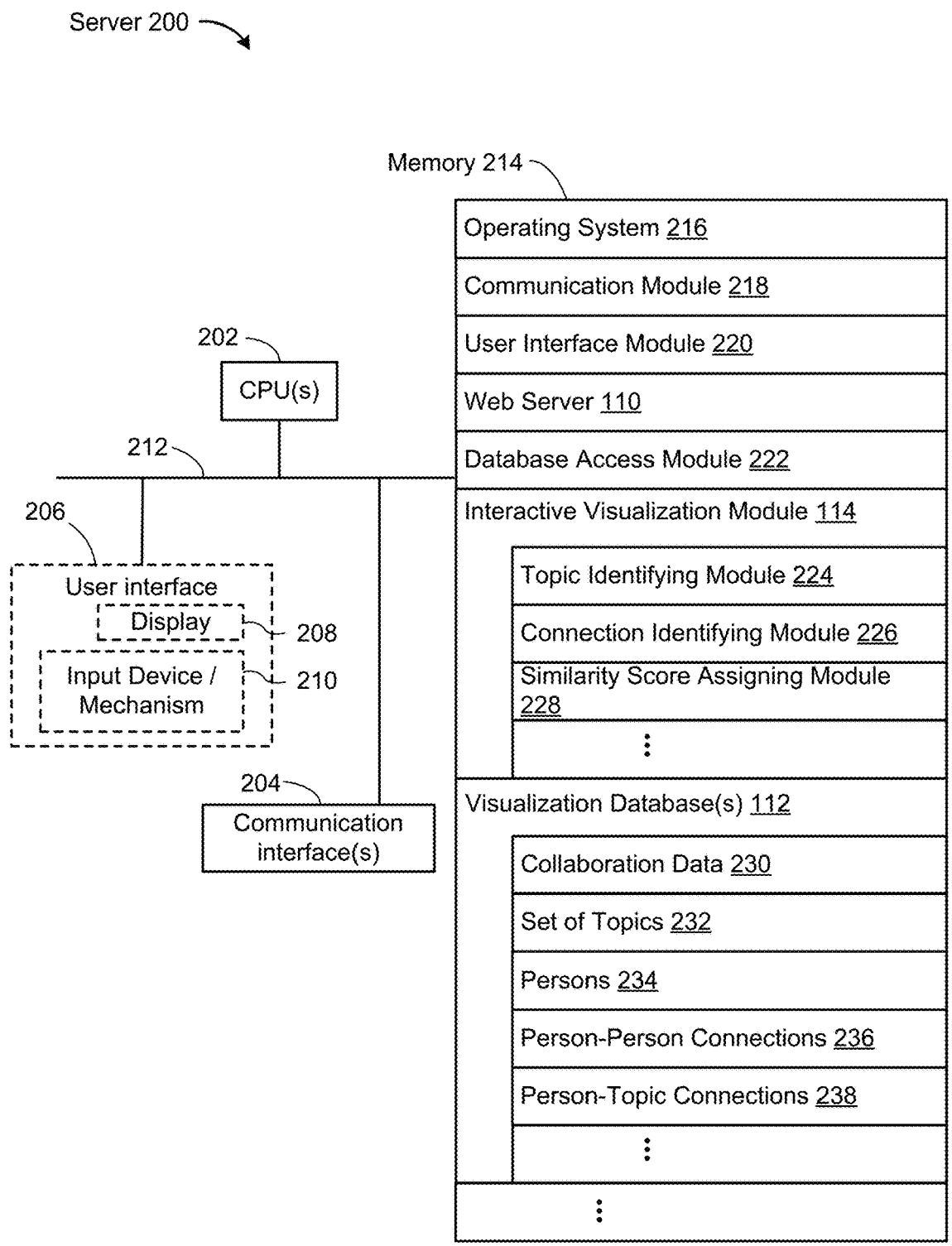
FIG. 2 is a block diagram illustrating a server in accordance with some implementations.

FIG. 2 is a block diagram illustrating a server 200 that may be used in a server system 104. A typical server system includes many individual servers 200, which may be co-located or located in multiple distinct physical locations. A server 200 typically includes one or more processing units (CPUs) 202 for executing modules, programs, or instructions stored in the memory 214 and thereby performing processing operations; one or more network or other communications interfaces 204; memory 214; and one or more communication buses 212 for interconnecting these components. The communication buses 212 may include circuitry (sometimes called a chipset) that interconnects and controls communications between system components. In some implementations, a server 200 includes a user interface 206, which may include a display device 208 and one or more input devices 210, such as a keyboard and a mouse.

Figure 3:
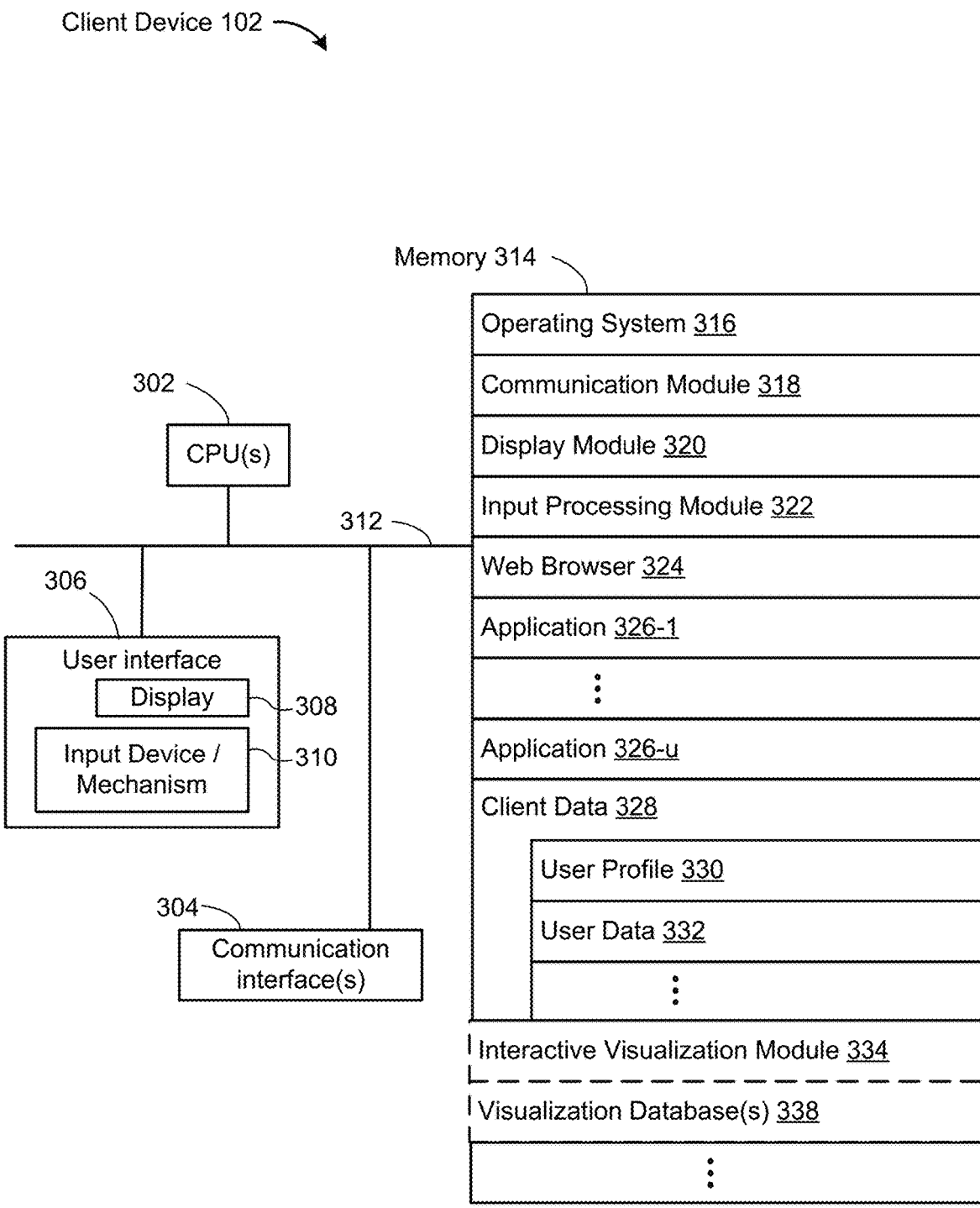
FIG. 3 is a block diagram illustrating a client device in accordance with some implementations.

In some implementations, the memory 214 includes high-speed random access memory, such as DRAM, SRAM, DDR RAM or other random access solid state memory devices. In some implementations, the memory 214 includes non-volatile memory, such as one or more magnetic disk storage devices, optical disk storage devices, flash memory devices, or other non-volatile solid state storage devices. In some implementations, the memory 214 includes one or more storage devices remotely located from the CPU(s) 202. The memory 214, or alternately the non-volatile memory device(s) within memory 214, comprises a non-transitory computer readable storage medium. In some implementations, the memory 214, or the computer readable storage medium of memory 214, stores the following programs, modules, and data structures, or a subset thereof:

- an operating system 216, which includes procedures for handling various basic system services and for performing hardware dependent tasks;
- a communication module 218, which is used for connecting the server 200 to other computers via the one or more communication network interfaces 204 (wired or wireless) and communication networks 108, such as the Internet, other wide area networks, local area networks, metropolitan area networks, and so on;
- a user interface module 220, which receives input from one or more input devices 210, and generates user interface elements for display on a display device (e.g., display 208 at a respective server or for display at a display device of a client device, such as display device 308 of client device 102, FIG. 3);
- one or more web servers 110, which receive requests from client devices 102, and return responsive web pages, resources, or links. In some implementations, each request is logged in a database (e.g., database 112);
- a database access module 222, which includes procedures for reading, writing, and querying data stored in the database 112 (in this way, a client device 102 is permitted to access data stored in the visualization database 112);
- an interactive visualization module 114, which is used to present topic-centric visualizations of collaboration data or to prepare data for presentation within a topic-centric visualization of collaboration data (the prepared data is used by a client device 102 to present the topic-centric visualization). In some implementations, the interactive visualization module 114 responds to requests from client devices (e.g., client device 102 sends a request for an interactive visualization of collaboration data in a particular dataset during a specified time period) by sending a set of topics for the particular dataset to the client devices (e.g., those identified by topic identifying module 224), sending information identifying person-person and person-topic connections in the particular dataset (e.g., those connection identified by connection identifying module 226), and information identifying assigned similarity scores for the identified connections (e.g., similar scores assigned by similar score assigning module 228). In some implementations, the interactive visualization module 114 includes the following modules, or a subset or superset thereof:

topic identifying module 224 for analyzing a dataset (e.g., information about a set of collaboration data) and identifying a set of topics for the dataset. In some implementations, an LDA-based algorithm is used to help identify the set of topics (as discussed in more detail below in reference to FIGS. 6A-6B and 7). In some implementations, the topic identifying module 224 is also used to compute a burst level for each topic in the set of topics (as discussed in more detail below in reference to FIGS. 6A-6B and 7);

connection identifying module 226 for identifying person-person (e.g., co-authors) and person-topic (e.g., people who have contributed to a particular topic during a specified time period) connections in a particular dataset (as discussed in more detail below in reference to FIGS. 6A-6B and 7); and similarity score assigning module 228 for assigning similarity scores to each of the connections identified by the connection identifying module 226 (e.g., for a respective person-topic connection, an assigned similarity score indicates relevance of a particular person to a particular topic during a specified time period);

one or more visualization databases 112, which store data used by the interactive visualization module 114 and/or one or more of the components thereof. In some implementations, the visualization databases 112 are relational databases, such as SQL databases while, in other implementations, the databases 112 include a collection of data structures, such as JSON objects, or combinations of relational databases and data structures that are stored in non-relational forms. In some implementations, the visualization databases 112 store:

collaboration data 230 collected from a variety of external services (e.g., externals services 122-1, FIG. 1, such as DBLP computer science bibliography, Google Docs, IEEE Digital Library, PubMed, and other websites hosting publications from scientific conferences and journals). In some implementations, the collaboration data 230 includes freely-available metadata about a plurality of documents (e.g., academic articles, general interest articles, social media postings, etc.);

set of topics 232 identified by topic identifying module (e.g., topic identifying module 224) for a particular set of collaboration data. In some implementations, the visualization database 112 includes sets of topics 232 for each set of collaboration data (in other implementations, often-used sets of topics 232 are stored and other sets of topics are identified on the fly and are not stored);

persons 234 associated with one or more person-person and person-topic connections identified by a connection identifying module (e.g., connection identifying module 226) for a particular set of collaboration data. In some implementations, the visualization database 112 includes persons 234 for each set of collaboration data (in other implementations, often-used persons 234 are stored and other persons are identified on the fly and are not stored);

person-person connections 236 identified by a connection identifying module (e.g., connection identifying module 226) for a particular set of collaboration data. In some implementations, the visualization database 112 includes person-person connections 236 for each set of collaboration data (in other implementations, often-used person-person connections 236 are stored and other person-person connections are identified on the fly and are not stored); and person-topic connections 238 identified by a connection identifying module (e.g., connection identifying module 226) for a particular set of collaboration data. In some implementations, the visualization database 112 includes person-topic connections 238 for each set of collaboration data (in other implementations, often-used person-topic connections 238 are stored and other person-topic connections are identified on the fly and are not stored).

Each of the above-identified elements in FIG. 2 may be stored in one or more of the previously mentioned memory devices. Each executable program, module, or procedure corresponds to a set of instructions for performing a function described above. The above-identified modules or programs (i.e., sets of instructions) need not be implemented as separate software programs, procedures or modules, and thus various subsets of these modules may be combined or otherwise re-arranged in various implementations. In some implementations, the memory 214 stores a subset of the modules and data structures identified above. Furthermore, the memory 214 may store additional modules or data structures not described above.

Although FIG. 2 illustrates a server 200, FIG. 2 is intended more as functional illustration of the various features that may be present in servers that are used in a server system 104 rather than as a structural schematic of the implementations described herein. In practice, and as recognized by those of ordinary skill in the art, items shown separately could be combined and some items could be separated. The actual number of servers 200 used to implement these features in a server system 104, and how features are allocated among them, will vary from one implementation to another, and may depend in part on the amount of data traffic that the system must handle during peak usage periods as well as during average usage periods.

FIG. 3 is a block diagram illustrating a client device 102 in accordance with some implementations. Client devices 102 include laptop computers, notebook computers, tablet computers, desktops computers, smart phones, and PDAs. A client device 102 typically includes one or more processing units (CPUs) 302, one or more network interfaces 304, memory 314, a user interface 306, and one or more communication buses 312 (sometimes called a chipset) for interconnecting these components. The user interface 306 includes one or more output devices 308 that enable presentation of media content, including one or more speakers and/or one or more visual displays. The user interface 306 also includes one or more input devices 310, including user interface components that facilitate user input such as a keyboard, a mouse, a voice-command input unit or microphone, a touch screen display, a touch-sensitive input pad, a camera (e.g., for taking photos at various business venues, although location information may not be stored along with the photos), a gesture capturing camera, or other input buttons or controls. Furthermore, some client devices 102 use a microphone and voice recognition or a camera and gesture recognition to supplement or replace the keyboard.

The memory 314 includes high-speed random access memory, such as DRAM, SRAM, DDR RAM, or other random access solid state memory devices. In some implementations, the memory includes non-volatile memory, such as one or more magnetic disk storage devices, one or more optical disk storage devices, one or more flash memory devices, or one or more other non-volatile solid state storage devices. In some implementations, the memory 314 includes one or more storage devices remotely located from the processing units 302. The memory 314, or alternatively the non-volatile memory within memory 314, comprises a non-transitory computer readable storage medium. In some implementations, the memory 314, or the non-transitory computer readable storage medium of memory 314, stores the following programs, modules, and data structures, or a subset or superset thereof:

- an operating system 316, which includes procedures for handling various basic system services and for performing hardware dependent tasks;
- a communication module 318, which is used for connecting a client device 102 to other computers and devices via the one or more communication network interfaces 304 (wired or wireless) and one or more communication networks 108, such as the Internet, other wide area networks, local area networks, metropolitan area networks, and so on;
- a display module 320, which receives input from the one or more input devices 310, and generates user interface elements for display on the display device 308 (and/or generates user interface elements for display based on information received from one or more servers 200, FIG. 2);
- an input processing module 322 for detecting one or more user inputs or interactions from one of the one or more input devices 310 and interpreting the detected input or interaction. In some implementations, the input processing module 322 detects changes to a selected time period (e.g., selected time period 424, FIGS. 4A and 4C) at a displayed timeline slider (e.g., timeline slide 422, FIGS. 4A and 4C) and, in response, submits requests to a server (e.g., via web browser 324) for updated information to display within an interactive visualization;
- a web browser 324, which enables a user to communicate over a network 108 (such as the Internet) with remote computers or devices;
- one or more applications 326-1-326-u, which are configured for execution by client device 102. In various implementations, the applications 326 include a camera module, a sensor module, one or more games, application marketplaces, payment platforms, and/or social network platforms. In some implementations, one or more of the applications 326 run within the web browser 324. In some implementations, the one or more applications include an application that allows a user of the device 102 to view and interact with interactive visualizations (e.g., using any of the methods described below, such as those described in reference to FIGS. 6A-6B and 7);
- client data 328, which includes information about the device 102 or users 106 of the device 102. In some implementations, the client data 328 includes one or more user profiles 330, which may include user-specific information that can be used to store user preferences about viewing interactive visualizations. In some implementations, the client data 328 includes user data, which logs user activity on the client device;
- optionally including an interactive visualization module 334 for locally generating an interactive visualization for presentation at the client device. In some implementations, the interactive visualization module 334 allows the client device to use one or more components of a server-side interactive visualization module (e.g., interactive visualization module 114 of server 200) in order to perform local operations or share performance of some of the operations performed by the one or more components with the server; and
- optionally including one or more visualization databases 338 for storing all or a portion of the data stored in visualization databases 112 (FIG. 2) when, e.g., network traffic conditions are slow and thus data can be more efficiently stored and accessed locally than by exchanging information with one or more servers 200 over a network.

Each of the above-identified executable modules, applications, or sets of procedures may be stored in one or more of the previously mentioned memory devices and corresponds to a set of instructions for performing a function described above. The above-identified modules or programs (i.e., sets of instructions) need not be implemented as separate software programs, procedures, or modules, and thus various subsets of these modules may be combined or otherwise re-arranged in various implementations. In some implementations, the memory 314 may store a subset of the modules and data structures identified above. Furthermore, the memory 314 may store additional modules or data structures not described above.

Although FIG. 3 shows a client device 102, FIG. 3 is intended more as a functional description of the various features that may be present rather than as a structural schematic of the implementations described herein. In practice, and as recognized by those of ordinary skill in the art, items shown separately could be combined and some items could be separated.

In some implementations, some of the functions of the server system 104 are performed by a client device 102, and the corresponding sub-modules of these functions may be located within the client device 102 rather than the server system 104 (as discussed above, e.g., functions performed by one or more components of interactive visualization module 114 (FIG. 2) by instead be performed by a client device using an optional interactive visualization module 334 (FIG. 3)). Conversely, in some implementations, some of the functions of a client device 102 are performed by server system 104, and the corresponding sub-modules of these functions may be located within the server system 104 rather than a client device 102. The server 200 and client device 102 shown in FIGS. 2 and 3 illustrate some implementations. Other configurations may be used to implement the functions described herein.

Figure 4A:
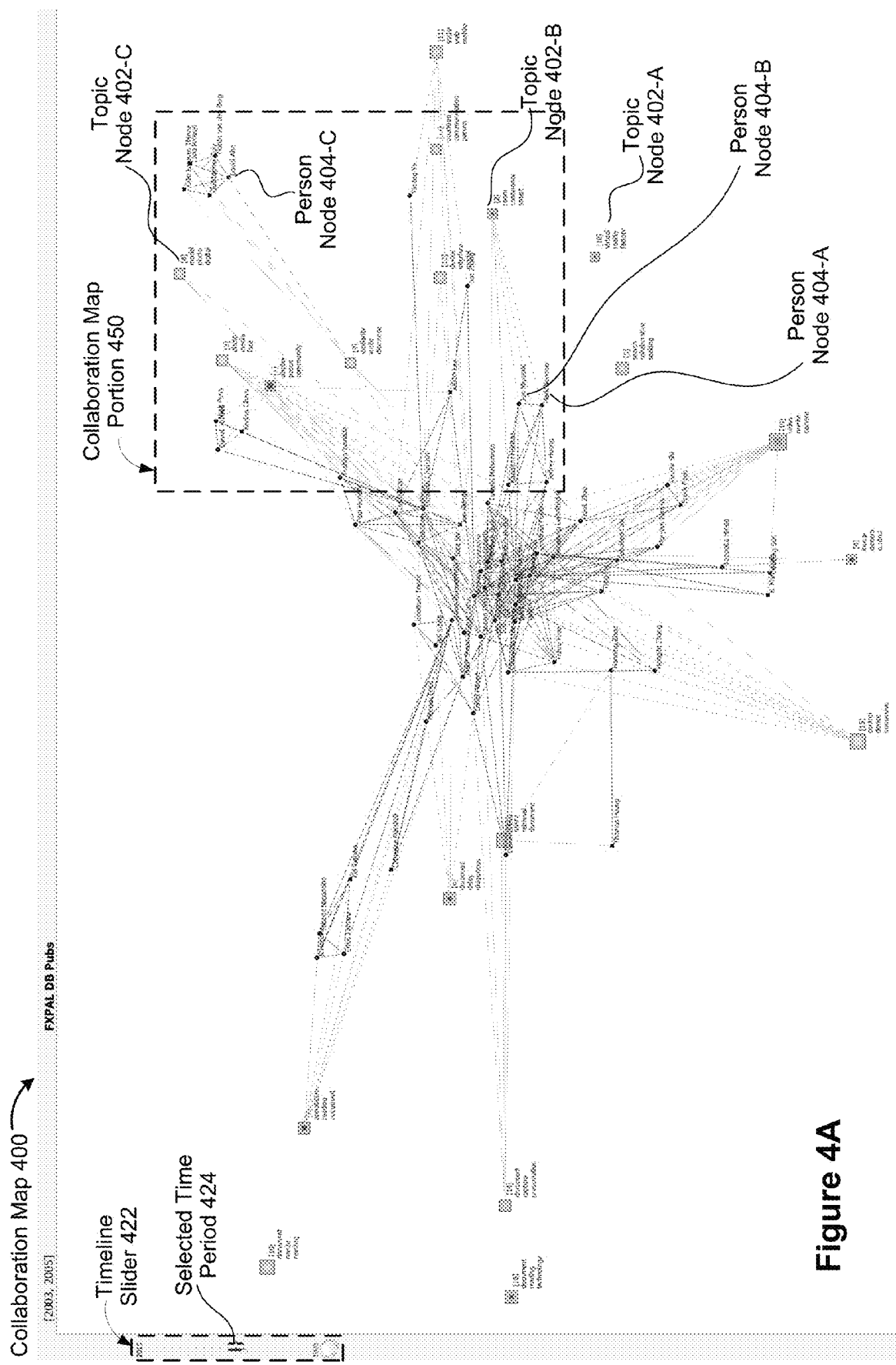
FIG. 4A is a user interface showing a visualization of collaboration data (e.g., a collaboration map), in accordance with some implementations.
Figure 4B:
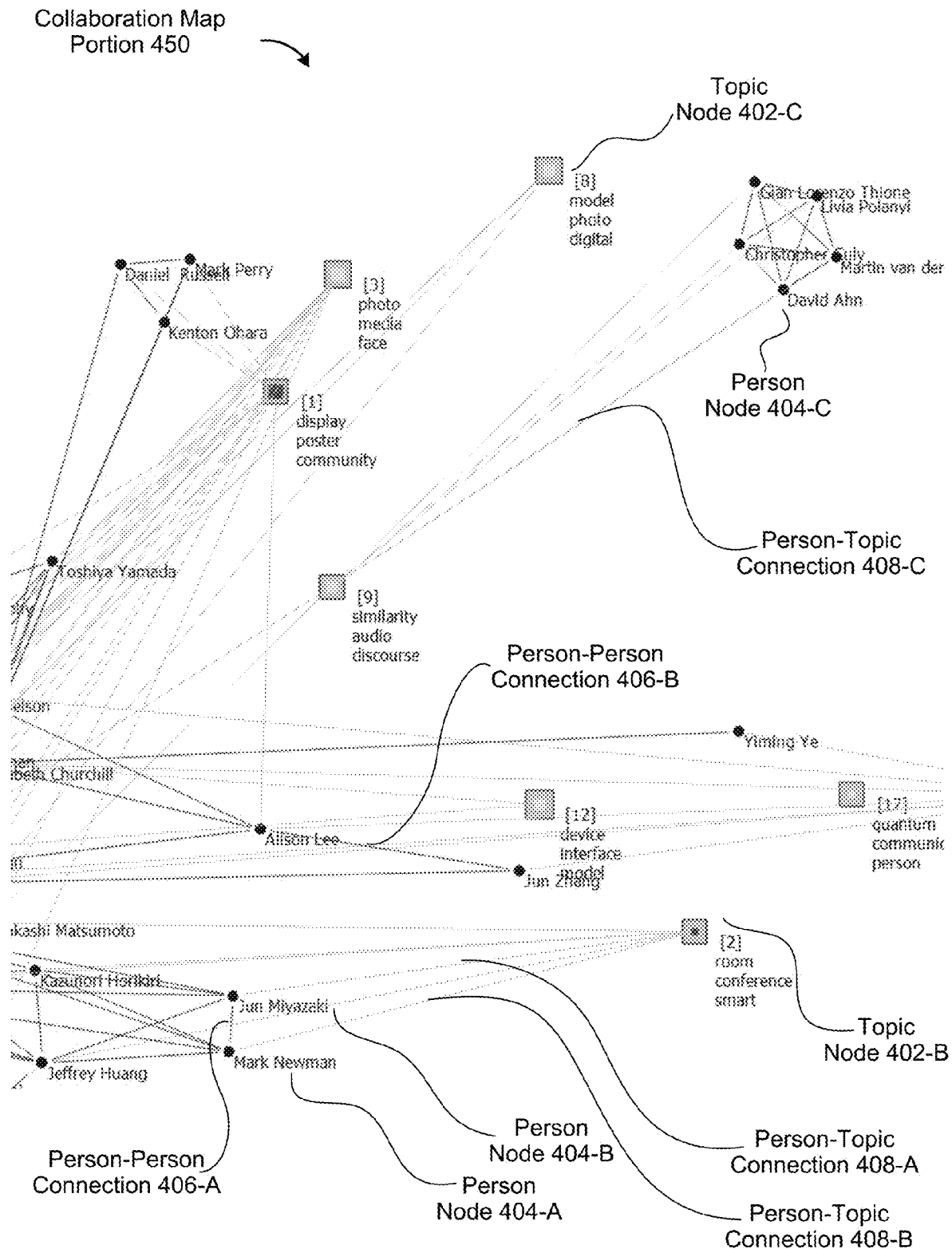
FIG. 4B is a user interface showing a portion of a visualization of collaboration data (e.g., a portion of a collaboration map), in accordance with some implementations.
Figure 4C:
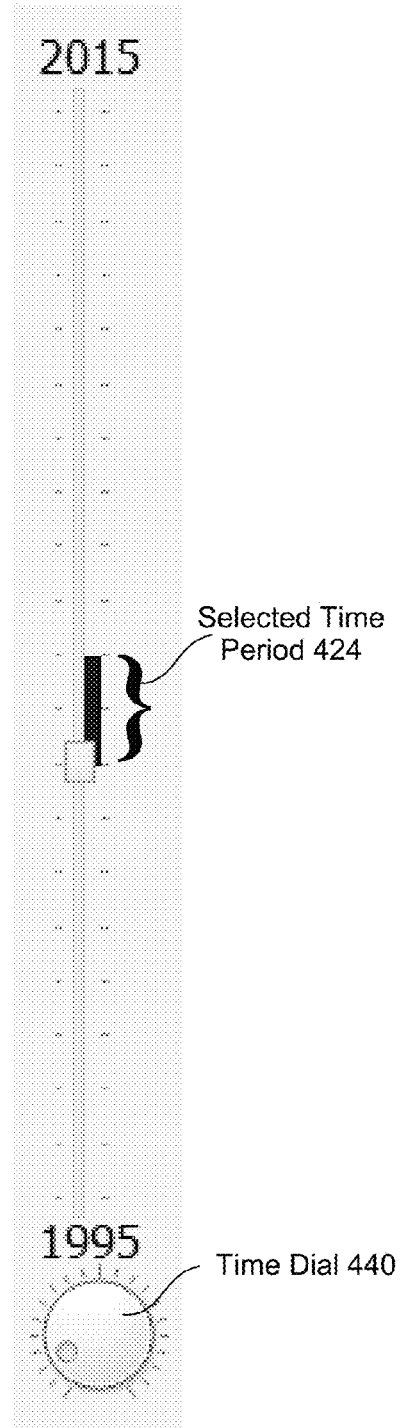
FIG. 4C is a user interface showing a timeline slider for a visualization of collaboration data, in accordance with some implementations.

FIGS. 4A, 4B, and 4C illustrate aspects of an example interactive visualization of collaboration data. Specifically, FIG. 4A is a user interface (e.g., a user interface displayed on a display of a computing device such as client device 102, FIG. 3) showing a visualization of collaboration data (also referred to as a collaboration map 400), in accordance with some implementations, FIG. 4B shows a close-up of a portion of the collaboration map 400 (e.g., collaboration map portion 450, and FIG. 4C shows a timeline slider (e.g., timeline slider 422) that can be used to select a time period for the collaboration map.

FIG. 4A shows an interactive visualization (collaboration map 400) for a plurality of articles published by Fuji-Xerox Palo Alto Laboratory ("FXPAL") and maintained in FXPAL's database of publications. Collaboration map 400 provides a visual representation of topics and associated persons during a specified time period (e.g., selected time period 424, corresponding to years 2003-2005, shown within timeline slider 422). For ease of explanation and to avoid cluttering the collaboration map, only a subset of the topic nodes, person nodes and connections shown in the collaboration map 400 have been labelled.

As shown in FIG. 4A, the collaboration map 400 includes topic nodes (e.g., topic nodes 402-A, 402-B, and 402-C), person nodes (e.g., person nodes 404-A and 404-B), visual representations of connections between persons and other persons (e.g., lines between person nodes representing co-authors, examples are labelled in FIG. 4B), and visual representations of connections between topics and persons (e.g., lines between nodes, examples are labelled in FIG. 4B).

In some implementations, each topic node is visually represented using a first user interface object that includes a square graphic and, optionally one or more of the following: an indication of a burst activity level for the topic (as discussed in more detail below, e.g., in reference to FIG. 7), a predefined number of topic component terms for the topic (e.g., 3 terms), and a numeric identifier for the topic. For example, topic node 402-A includes the square graphic (and an indication that the burst activity level for the topic is low), 3 topic component terms ("virtual," "reality," and "factory"), and a numeric identifier ("18") that is displayed in square brackets (as shown in FIGS. 4A and 4B). In some implementations, the topic nodes are positioned such that similar topics are located closer together (e.g., topic node 402-B is more similar to topic node 402-A than it is to topic node 402-C, as shown in FIGS. 4A and 4B).

In some implementations, each person node is visually represented using a second user interface object (distinct from the first user interface objects for the topic nodes discussed above) that includes a circular graphic and a name of a person associated with the person node. For example, person node 404-A includes the circular graphic and the name "Mark Newman" (as shown in FIGS. 4A and 4B). In some implementations, the person nodes are positioned such that similar persons are located closer together (e.g., person node 404-A is more similar to person node 404-B than it is to person node 404-C, as shown in FIGS. 4A and 4B).

In some implementations, the visual representations of connections between persons and other persons are visually represented as respective lines connecting a person and a different person (e.g., person-person connection 406-A connects person node 404-A with person node 404-B). In some implementations, length of a respective visual representation for a person-person connection provides an indication of similarity between connected persons (shorter length provides an indication of a higher similarity score, e.g., person-person connection 406-A is associated with a higher similarity score than person-person connection 406-B, as shown in FIGS. 4A-4B).

In some implementations, the visual representations of connections between persons and topics are visually represented as respective lines connecting a person and a topic (e.g., person-topic connection 408-A connects person node 404-B with topic node 402-B). In some implementations, the visual representations of person-topic connections are visually distinct from the visual representations of person-person connections (e.g., lines of different colors, different widths, etc.). In some implementations, length of a respective visual representation for a person-topic connection provides an indication of similarity between the connected person and topic (shorter length provides an indication of a higher similarity score, e.g., person-topic connection 408-A is associated with a higher similarity score than person-topic connection 408-B, as shown in FIGS. 4A-4B).

In some implementations, the topic nodes are displayed at fixed positions within the collaboration map 400 and the person nodes are displayed at transitory (i.e., temporary) positions, so that when a user manipulates the selected time period (e.g., using timeline slider 422, FIG. 4A and also shown in more detail in FIG. 4C), the topic nodes do not change position, but the person nodes do change positions within the collaboration map 400. In some implementations, the changes in position for person nodes are animated as the user manipulates the selected time period using the timeline slider 422 and, thus, the user is provided with a clear view as to how collaborations have changed relative to the fixed topics over various time periods. In some implementations, person nodes also appear and disappear, depending on similarity scores associated with the person nodes and their connections to topic nodes (e.g., only those having similarity scores above a threshold are shown for a selected time period, as is explained in more detail below in reference to FIG. 7).

At a high-level, the collaboration map 400 shows which people collaborated on what topics in a selected time period (e.g., selected time period 424, FIG. 4A). In some implementations, nodes for documents (e.g., documents that are a part of the collaboration data used to render the collaboration map 400, such as the FXPAL publications) are not rendered in the collaboration map 400, since they are not needed to extract valuable information from the visualization. In some implementations, quickly clicking on a person node within the collaboration map 400 (e.g., clicking on person node 404-A) causes the computing device to display a list of authored documents that correspond to a person represented by person node 404-A (e.g., Mark Newman). In some implementations, a respective person node can be selected and dragged to see it and its links better (e.g., by clicking on person node 404-C and maintaining the click for a threshold period of time, a user can then drag the node 404-C and its associated connections around in order to view anything that is hidden/obscured below). In some implementations, this allows users to clearly view data when there is clutter around a respective person node. When the node is let go (e.g., when the user releases the click), the respective person node bounces back to its location in the collaboration map.

In some implementations, a relevance score threshold parameter controls how many person nodes are filtered and visualized. In some implementations, nodes with similarity scores above the threshold are retrieved. A person node's similarity score with respect to a topic node is based on cosine similarity of the person's documents to the topic. A document may be relevant to more than one topic (unlike publication venues). The relevance score can be set to achieve different purposes, such as finding highly relevant Person nodes by using a high value, or to reduce clutter and occlusion by using a moderate value. Additional details regarding similarity scores and the use of thresholds is provided below in reference to FIG. 7.

In some implementations, the collaboration map 400 is optimized for display on a high resolution screen, such as a 4K display.

Figure 5A:
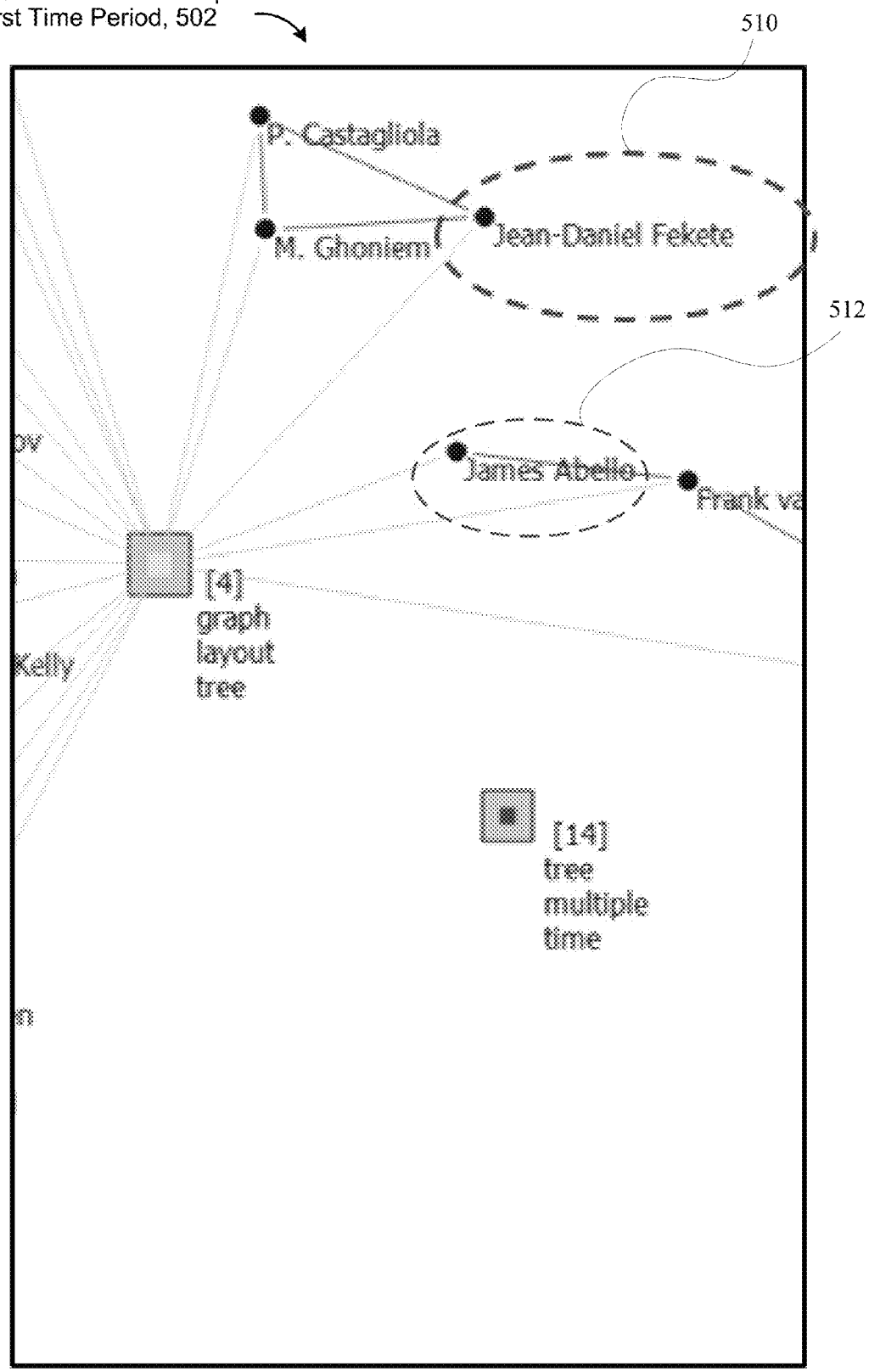
FIGS. 5A-5C show a sequence of user interfaces for a portion of a visualization of collaboration data as a time period for the visualization is manipulated, in accordance with some implementations.
Figure 5B:
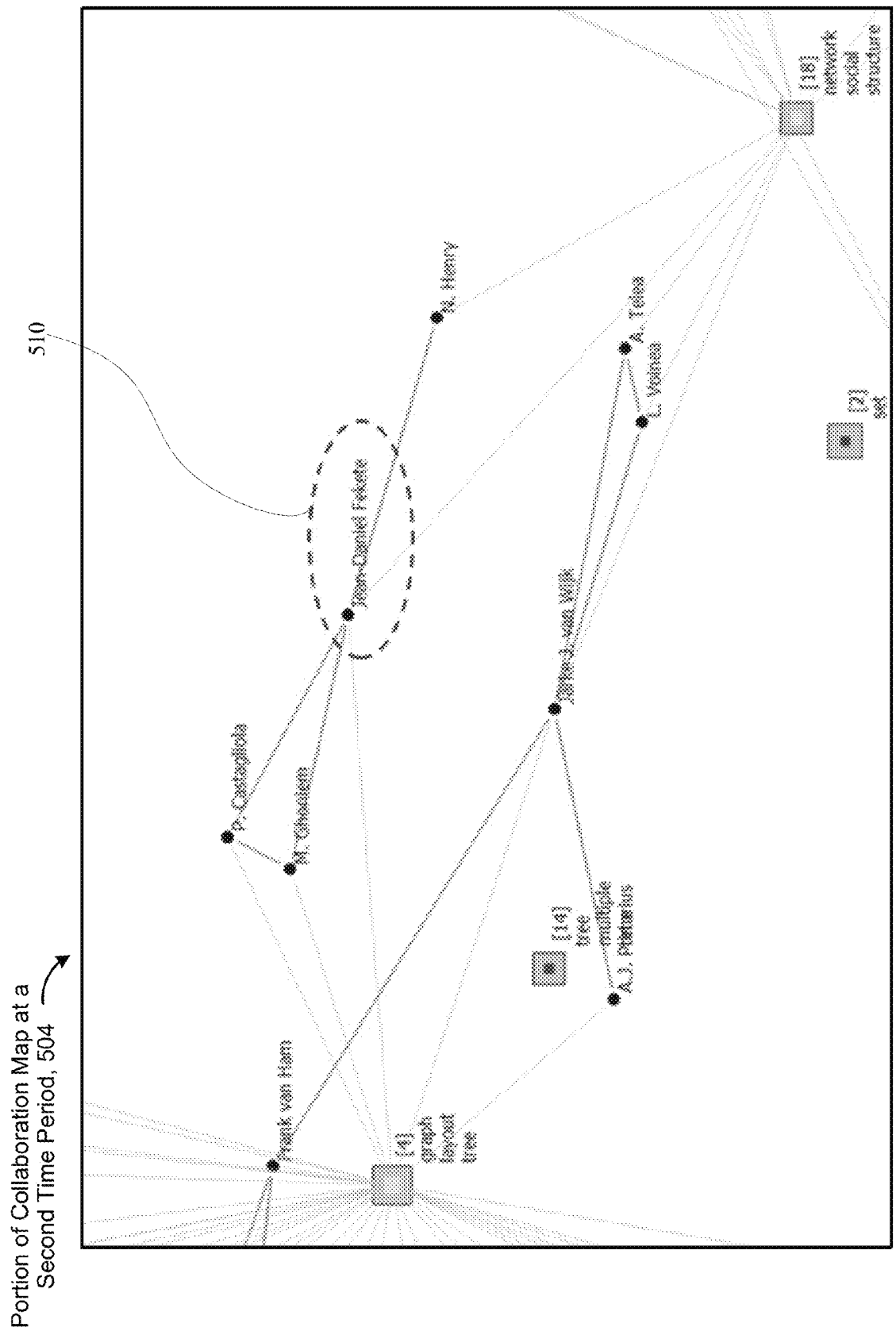
Figure 5C:
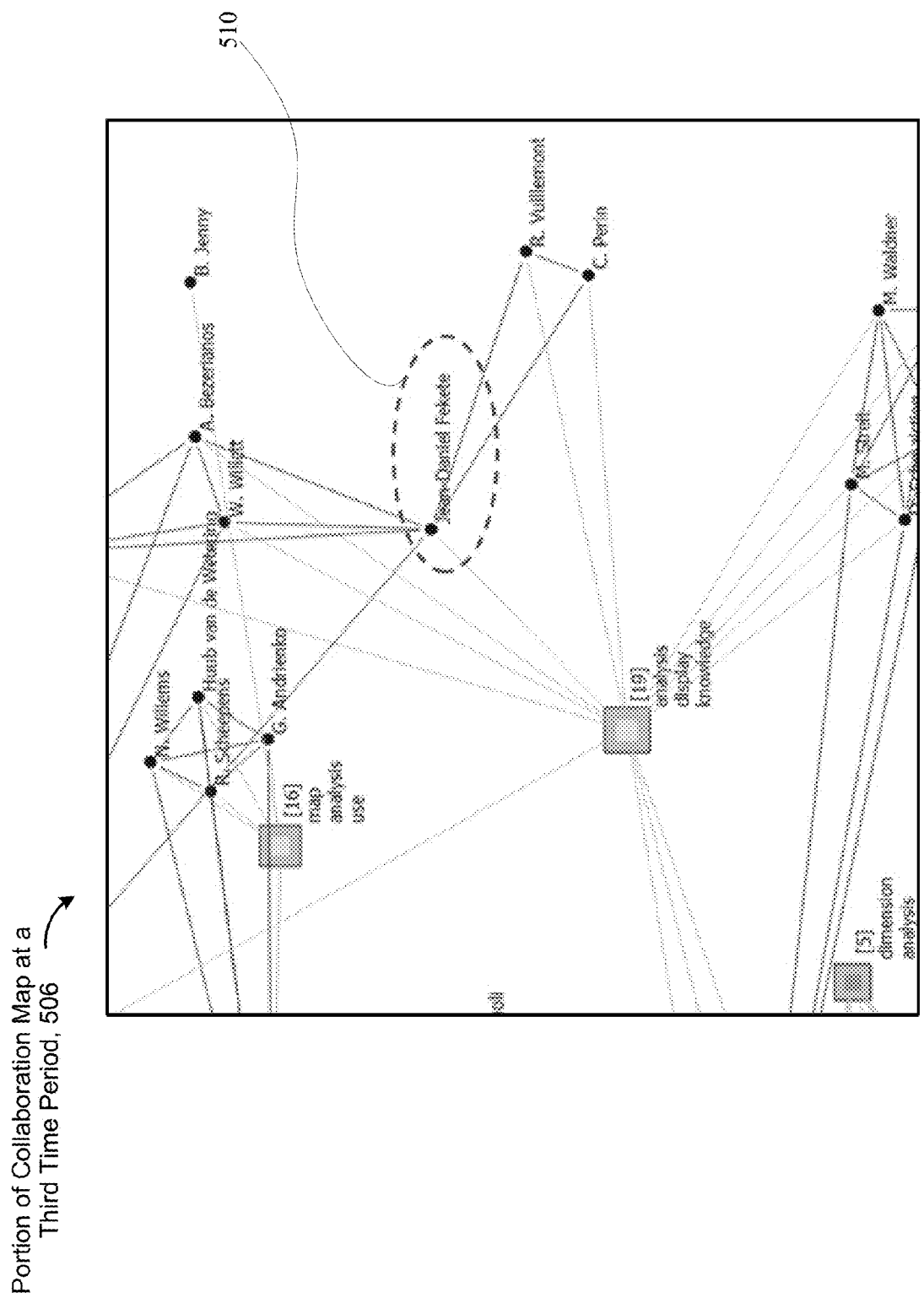

FIGS. 5A-5C show a sequence of user interfaces for a portion of a visualization of collaboration data as a time period for the visualization is manipulated (502, 504, and 506, respectively), in accordance with some implementations.

More specifically, FIG. 5A shows a portion of a collaboration map for a first time period (e.g., year 2002 to year 2004). During the first time period, a first person node 510 that is associated with "Jean-Danial Fakete" is connected to one topic node (for "[4] graph layout tree") and is connected to two other person nodes that are associated with two different persons ("P. Castagliola" and "M. Ghoniem"). Turning now to FIG. 5B, during the second time period (e.g., from year 2004 to year 2006), the first person node 510 is now connected to an additional person node (associated with "N. Henry") and to an additional topic node (for "[18] network social structure"). Additionally, a second person node 512 (FIG. 5A) is no longer shown in FIG. 5B (as the associated person is not relevant enough during the second time period, e.g., because similarity scores associated with the second person node 512 do not exceed a score threshold).

FIG. 5C shows a later time period (from year 2011 to year 2013) relative to the time periods shown in FIGS. 5A-5B and shows changes to topic and person nodes connected to the first person node 510 (the person node representing "Jean-Daniel Fakete"). During the later time period, the first person node 510 for "Jean-Daniel Fakete" has moved to another portion of the collaboration map, and is now associated with a different topic ("[19] analysis display knowledge") and with other people/collaborators (e.g., "R. Vuillemont" and "C. Perin").

In this way, by manipulating a timeline slider to select different time periods (e.g., timeline slider 422, FIGS. 4A and 4C), a user is able to quickly and easily view changes in collaborations between people and the topics to which they have contributed during the selected time period (and to view only the most relevant persons during the selected time period, as illustrated by changes to topics and persons connected with the first person node 510 in FIGS. 5A-5C).

Figure 6A:
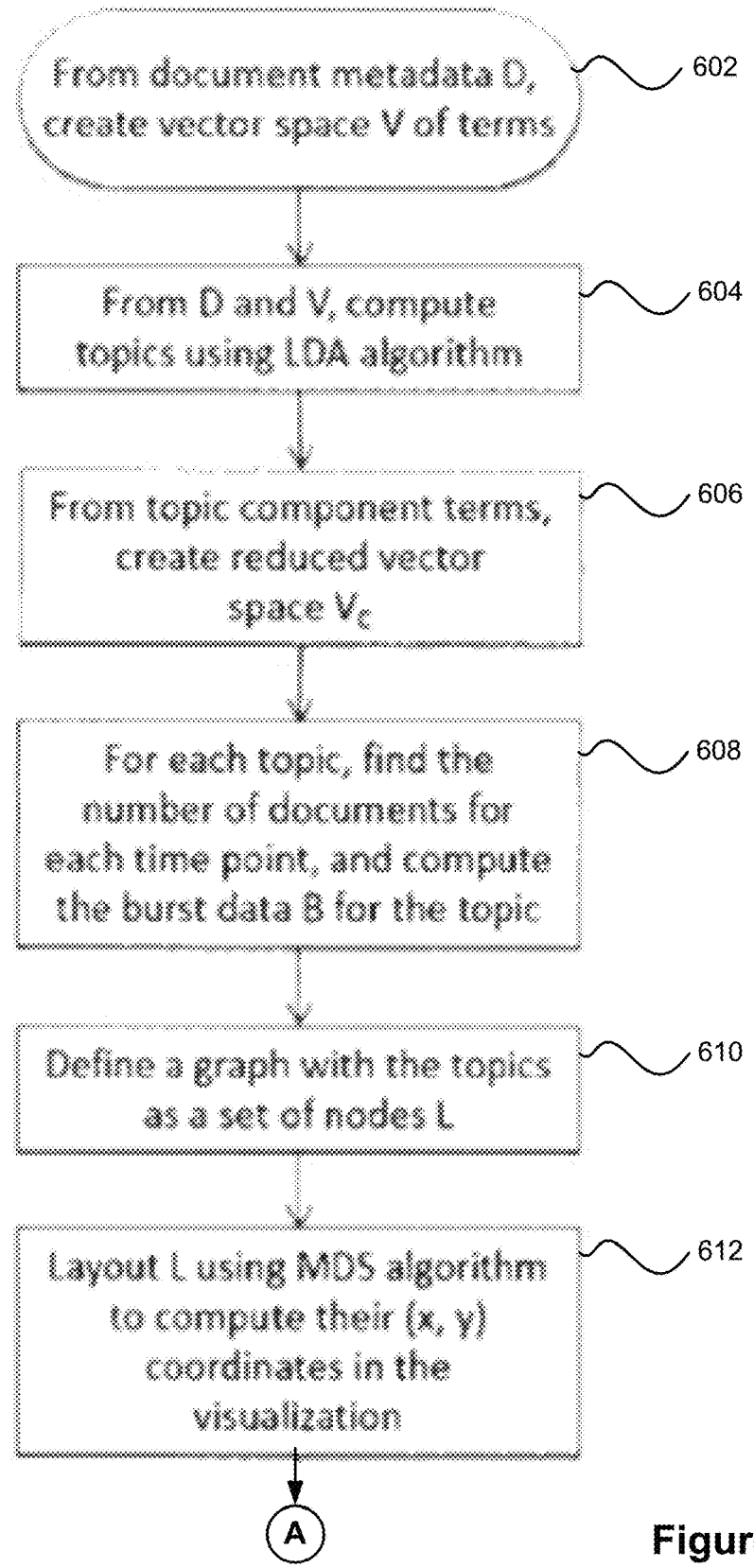
FIGS. 6A-6B are a flowchart showing a method of presenting an interactive visualization of collaboration data, in accordance with some implementations.
Figure 6B:
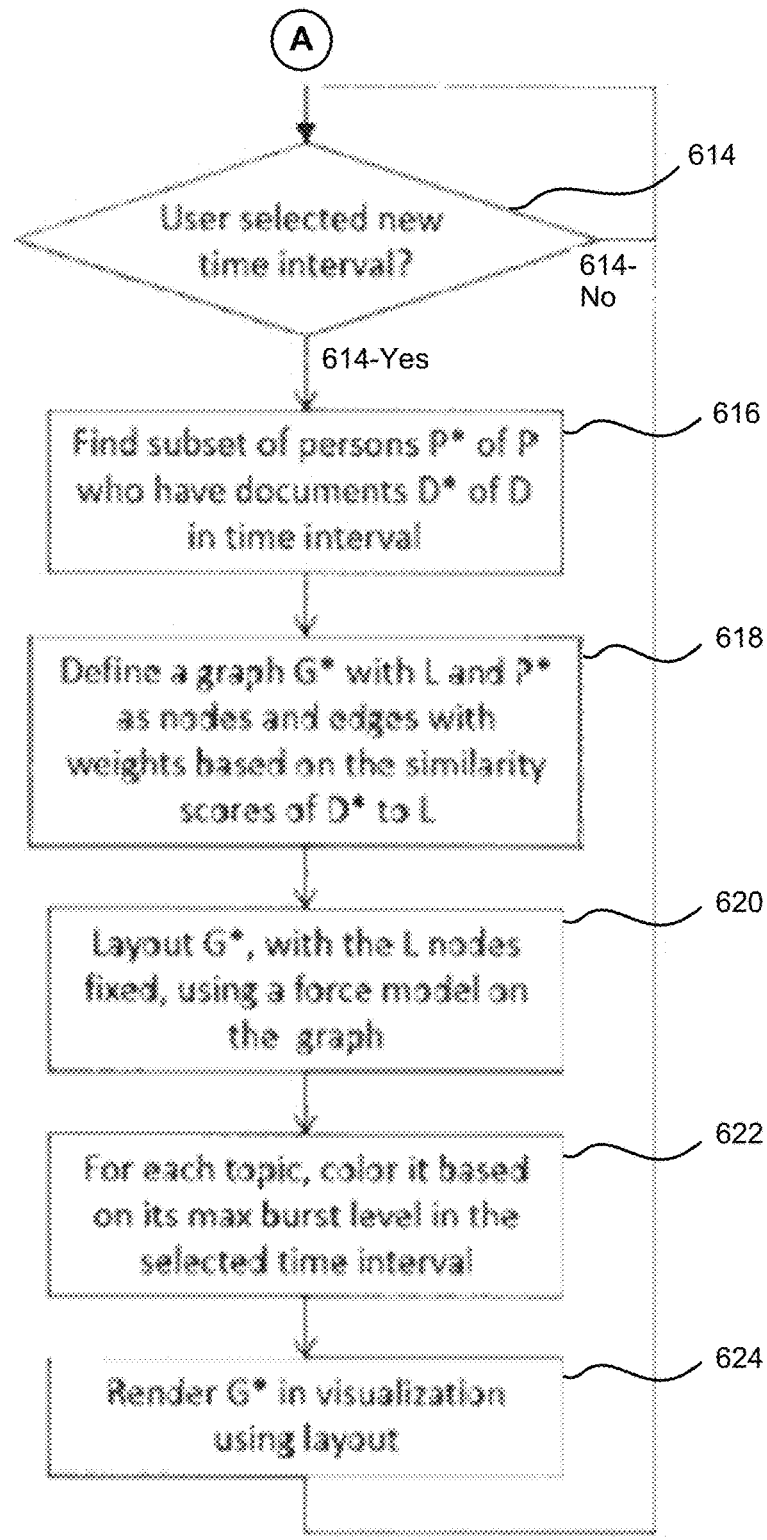

FIGS. 6A-6B are a flowchart depicting a method of presenting an interactive visualization of collaboration data, in accordance with some implementations. In some implementations, the method 600 is performed by a computing device (e.g., computing device 102, FIG. 1) and/or one or more components of the computing device (e.g., operating system 126, etc.). In some implementations, the method 600 is performed by the computing device in combination with one or more servers 200 (FIG. 2), e.g., the one or more servers 200 send data to the computing device 102 that is used by the computing device to execute the operations of method 600 (i.e., some operations of method 600 are performed by the one or more servers 200). In some implementations, the method 600 is governed by instructions that are stored in a non-transitory computer-readable storage medium and that are executed by one or more processors of a device, such as the one or more processors 302 of device 102 (FIG. 3). For ease of explanation, the following describes method 600 as performed by the device 102. In some implementations, with reference to FIG. 3, the operations of method 600 are performed by or use, at least in part, a visualization database 338, an interactive visualization module 334 (e.g., in communication with one or more components of a server-side interactive visualization module 114, FIG. 2), display module 320, input processing module 322, web browser 324, communication module 318, input devices 310, display 308 (e.g., a touch-sensitive display), and the device 102 also receives data from one or more servers 200 (e.g., collaboration data 230, set of topics 232, persons 234, person-person connections 236, and person-topic connections 238, FIG. 2) that is used to perform one or more of operations of method 600. Some operations in method 600 are, optionally, combined and/or the order of some operations is, optionally, changed.

As shown in FIG. 6A, an example method 600 begins by identifying a dataset D (e.g., metadata about collaboration data) and creating a vector space V of terms for the dataset (602). In some implementations, the dataset consists of document metadata. In some implementations, the metadata contains time information (e.g. year of publication), and some amount of text (e.g. abstract) for use during topic modeling operations.

In some implementations, words are extracted from the metadata (abstract, keywords, title, etc.) and stop-words are removed. To create the vector space V of terms, each document is represented as a vector of term counts, creating the vector space of terms V. From V, a list of k topics is determined using a specified algorithm (604) (e.g., LDA algorithm of Blei, as discussed above). In some implementations, the number k of topics is predetermined (or alternatively k can be chosen by the user).

Dimension reduction is performed (606) on V using the results of the LDA algorithm as described below. Each topic is composed of component terms with associated probabilities of the word conditioned on the topic. The probabilities are sorted and since the values decrease rapidly, we keep only m terms for each topic (we use m=10). The component terms may overlap between the k topics. The union of these component terms create a subspace $V_c$ of V, with dim($V_c$) ~k*m. By reducing the dimension, scale to large datasets is easier, and computation time and memory space are used efficiently (which is especially important in implementations in which data needs to be sent to web browsers for presenting the visualizations at a client device).

In some implementations, burst detection is computed for the topics. For example, for each topic, a number of relevant documents is found for each time point (608) to generate an activity stream. A burst detection algorithm (e.g., Kleinberg, J. Bursty and hierarchical structure in streams—*Proceedings of KDD'05*, pp. 91-101, which is hereby incorporated by reference in its entirety) is applied to the activity stream of each topic. Then for each time point of a topic, a burst level is assigned (e.g. {0, 1, 2, 3}, where the highest activity level is labeled 3). In some implementations, these are mapped to different "heat" colors in the visualization (e.g. {green, yellow, orange, red} that are presented in user interface elements corresponding to each of the topic nodes, as shown in FIGS. 4A-4B and 5A-5C).

To layout the Topic nodes in the visualization, a graph is defined that includes the topics as a set of nodes L (610). In some implementations, multidimensional scaling (MDS) may be utilized, based on the cosine similarity between topics in the vector space of terms (610-612), in order to layout L (e.g., determined x,y coordinates for each of the topics within the visualization). In some implementations, cosine similarity is computed with respect to $V_c$.

In some implementations, a timeline slider is provided (e.g., timeline slider 422, FIG. 4C) along with a dial (e.g., time dial 440, FIG. 4C) that is used to select a time position and an interval length (e.g., to determine the selected time period 424, FIG. 4C). The selected time interval (614) is used to filter the Person nodes (to produce P*), such that only the people with documents authored in the selected time period (D*) are shown in the visualization (616). In some implementations, operations 616-624 are performed each time a new time period (614—Yes) is selected using the timeline slider, in order to produce a visualization that corresponds to the new time period. If no new time period is selected (614-No), then the visualization is maintained without re-performing any of the operations of method 600 (e.g., on a display of a computing device, FIG. 3).

In some implementations, a graph G* is defined with L and P* as nodes and edges with weights based on similarity scores of D* to L (618). The links between person nodes with co-author relationships in the selected time period are highlighted (e.g., in purple). Links are shown between Person nodes and their relevant topic nodes (e.g., in gray). These links define forces to drive the animation and to generate the node-link layout. In some implementations, G* is laid out by using fixed positions for the L nodes and using a force directed layout model on the graph G* (620). In some implementations, additional forces are specified between person nodes with co-author relationships based on the number of co-authored documents or the similarity between the co-authored documents.

In some implementations, topic nodes are colored based on maximum burst level for the selected time period (622). The size of each color patch represents a percent of the activity (with respect to the topic's total activity over time) during that time period. As a timeline slider is manipulated within a visualization (e.g., timeline slider 422, FIG. 4A), a topic's popularity level (similarity score with respect to a currently-selected time period) can visually increase and then decrease, along with other topics' visually changing popularity levels.

It should be understood that the particular order in which the operations in FIGS. 6A-6B have been described is merely exemplary and is not intended to indicate that the described order is the only order in which the operations could be performed. One of ordinary skill in the art would recognize various ways to reorder the operations described herein (e.g., by combining one or more of the operations of method 600 with one or more of the operations of method 700 described below).

Figure 7:
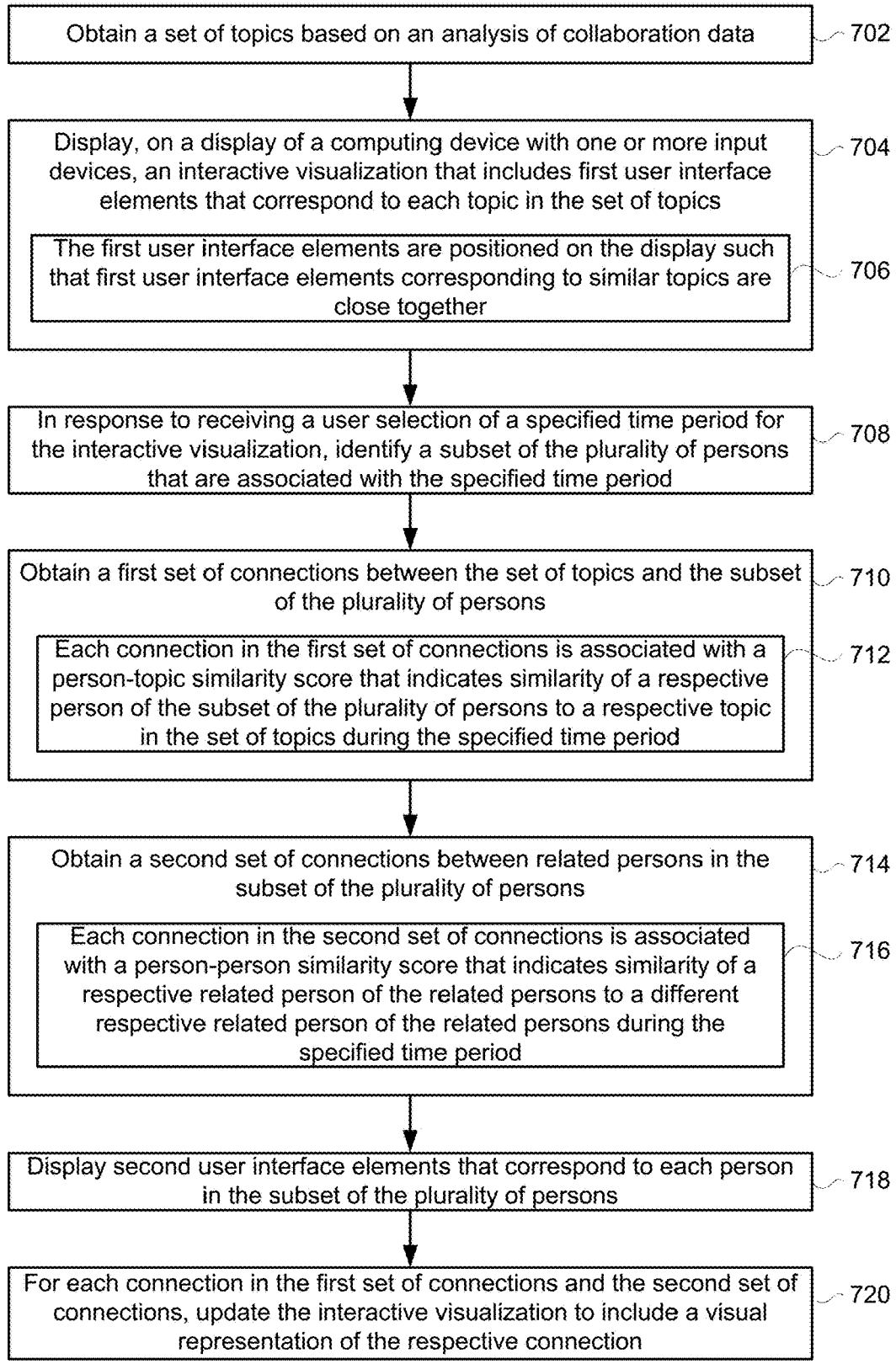
FIG. 7 is a flowchart showing a method of presenting an interactive visualization of collaboration data, in accordance with some implementations.

FIG. 7 is a flowchart depicting a method of presenting an interactive visualization of collaboration data, in accordance with some implementations. In some implementations, the method 700 is performed by a computing device (e.g., computing device 102, FIG. 1) and/or one or more components of the computing device (e.g., operating system 126, etc.). In some implementations, the method 700 is performed by the computing device in combination with one or more servers 200 (FIG. 2), e.g., the one or more servers 200 send data to the computing device 102 that is used by the computing device to execute the operations of method 600 (i.e., some operations of method 700 are performed by the one or more servers 200). In some implementations, the method 700 is governed by instructions that are stored in a non-transitory computer-readable storage medium and that are executed by one or more processors of a device, such as the one or more processors 302 of device 102 (FIG. 3). For ease of explanation, the following describes method 700 as performed by the device 102. In some implementations, with reference to FIG. 3, the operations of method 700 are performed by or use, at least in part, a visualization database 338, an interactive visualization module 334 (e.g., in communication with one or more components of a server-side interactive visualization module 114, FIG. 2), display module 320, input processing module 322, web browser 324, communication module 318, input devices 310, display 308 (e.g., a touch-sensitive display), and the device 102 also receives data from one or more servers 200 (e.g., collaboration data 230, set of topics 232, persons 234, person-person connections 236, and person-topic connections 238, FIG. 2) that is used to perform one or more of operations of method 700. Some operations in method 700 are, optionally, combined and/or the order of some operations is, optionally, changed.

In some implementations, the method 700 optionally begins when the device obtains (702) a set of topics based on an analysis of collaboration data. In some implementations, a predefined number of topics are obtained (e.g., from a server system, such as server system 104, FIG. 1). In some implementations, the predefined number is less than all available topics in order to limit clutter in the interactive visualization if too many topics are presented at the same time. In some implementations, the analysis uses an LDA algorithm (as discussed above in reference to FIGS. 6A-6B) to identify the set of topics and the LDA analysis is performed by a server system (e.g., server system 104, FIG. 1) that sends the set of topics to the device.

In some implementations, the collaboration data includes freely-available metadata about a plurality of documents. In some implementations, the information is obtained from websites associated with publication services (such as PubMed and others mentioned above). In some implementations, the freely-available metadata about the plurality of documents includes, for a respective document of the plurality of documents, author information, a document abstract, date of publication, a document title, and metadata keywords. In some implementations, the metadata further includes: author identification, editor identification, publisher identification, contributor identification, document title, date, venue, document abstract, and document key words.

In some implementations, the set of topics are identified based on an analysis of information about the collaboration data (e.g., a plurality of documents that are associated with the plurality of persons). In some implementations, the identification and analysis of the set of topics are performed by a server that is distinct from the computer system. In some implementations, the collaboration data (e.g., the individual documents or other type of collaboration data being visualized) is not displayed in the interactive visualization (i.e., only topics and their relationships with the plurality of persons are displayed, no individual documents are displayed).

In some implementations, the device displays (704) display, on a display (e.g., display 308, FIG. 3), an interactive visualization (e.g., collaboration map 400, FIG. 4A) that includes first user interface elements that correspond to each topic in the set of topics (e.g., topic nodes 402-A, 402-B, and 402-C, FIGS. 4A and 4B). The first user interface elements are positioned (706) on the display such that first user interface elements corresponding to similar topics are close together (i.e., located near one another within the collaboration map 400). For example, multi-dimensional scaling (MDS) is used to layout topic nodes in the visualization based on cosine similarity between topics in a vector space of terms (as discussed above in reference to FIGS. 6A-6B). In some implementations, the device obtains a topic-topic similarity score for each pair of topics in the set of topics and those similarity scores are used to help determine relative positions of the first user interface elements corresponding to each topic.

In some implementations, a respective first user interface element for a respective topic is displayed with: (i) an identifier (e.g., a unique numerical identifier or a unique identifier containing at least one alpha-numeric or symbolic character) and (ii) a predefined number (e.g., 3, 4, or 5) of topic component terms that are associated with the respective topic. For example, topic node 402-A includes a square graphic (and an indication that the burst activity level for the topic is low), 3 topic component terms ("virtual," "reality," and "factory"), and a numeric identifier ("18") that is displayed in square brackets (as shown in FIGS. 4A and 4B). In some implementations, the predefined number of topic component terms are determined by extracting words from the information about the plurality of documents, representing each document as a vector of terms counts based on the words (e.g., in a vector space of terms), and computing the predefined number of topics using an algorithm, such as LDA (as discussed above in reference to FIGS. 6A-6B). In some implementations, dimension reduction is then performed on the vector space of terms in order to produce a subset of the vector space, so that embodiments are able to scale gracefully to very large datasets (by allowing for more efficient use of computing resources and memory space).

In some implementations, the identifier is an editable field and the device detects a selection of the identifier for a respective first user interface element and, in response to detecting the selection of the identifier, the device allows a user to input a descriptive name for the respective topic (e.g., by displaying a dialog box after the user has clicked on the identifier). In some implementations, after the user inputs the descriptive name, the descriptive name is displayed within the interactive visualization instead of the identifier.

In some implementations, the interactive visualization is initially displayed for a default time period that is based on publication dates for documents associated with the subset of the plurality of persons and is selected to include all available documents (i.e., the interactive visualization is initially displayed so that it shows the full dataset)

In some implementations, the device receives (708), via one or more input devices (e.g., input devices 310, FIG. 3), a user selection of a specified time period for the interactive visualization (e.g., based on user manipulation of a timeline slider, such as timeline slider 422, FIGS. 4A and 4C). In this way, a user is able to quickly and easily see a visual representation of relationships between authors and topics over a specified period of time (and between authors and other authors). In some implementations, the request includes an identifier for a plurality of documents, e.g., the user is able to create the interactive visualization based on a chosen plurality of documents (such as an academic repository of published documents or the like).

In response to receiving the user selection of the specified time period, the device identifies (708) a subset of the plurality of persons that are associated with the specified time period (e.g., based on documents published during the specified time period, based on social media posts made during the specified time period, or based on code check-ins during the specified time period, depending on the type of collaboration data being visualized).

In some implementations, the device obtains (710) a first set of connections between the set of topics and the subset of the plurality of persons (i.e., person-topic connections). Each connection in the first set of connections is associated (712) with a person-topic similarity score that indicates similarity of a respective person of the subset of the plurality of persons to a respective topic in the set of topics during the specified time period. The device also obtains (714) a second set of connections between related persons in the subset of the plurality of persons. Each connection in the second set of connections is associated (716) with a person-person similarity score that indicates similarity of a respective related person of the related persons to a different respective related person of the related persons during the specified time period.

In some implementations, the person-topic and person-person similarity (or relevance) scores provide a measurable indication as to how relevant a particular author is to a particular topic (or a person to another person), and the relevance score is typically for a specified period of time, so that a particular person's relevance to a particular topic may change over time to become more or less relevant based on their contributions to a particular topic during various time periods. In some implementations, assigning similarity scores is performed by a server system (e.g., server system 104, FIG. 1). In some implementations, the assigned scores are initially assigned with respect to a default time period (e.g., a period of time that includes activity for all persons, or dates that correspond to all publications associated with the persons) and the assigned scores are then updated in response to user selections of new time periods (i.e., assigned scores are updated in conjunction with operation 708).

In some implementations, the device displays (718) second user interface elements that correspond to each person in the subset of the plurality of persons (e.g., person nodes 404-A, 404-B, and 404-C, FIGS. 4A and 4B). In some implementations, the second user interface elements are positioned so that second user interface elements for persons that are similar to particular topics and particular persons are located near to those topics and those persons (e.g., based on application of a force directed layout model in which the forces are based on the similarity scores). In some implementations, the plurality of persons are authors of a plurality of documents included in the collaboration data and each connection in the second set of connections between related persons indicates a relationship between co-authors.

In some implementations, displaying a respective second user interface element for a respective person includes, in accordance with a determination that at least one assigned person-topic similarity score that is associated with the respective person satisfies a person-topic similarity threshold, updating the interactive visualization to include the second user interface element (i.e., only those persons that are relevant to the selected time period are included in the interactive visualization).

For each connection in the first set of connections and the second set of connections, the device updates (720) the interactive visualization to include a visual representation of the respective connection. An example visual representation is a displayed line connecting two related persons associated with a respective connection (e.g., two co-authors). Example visual representations for person-person connections are shown in FIGS. 4A and 4B, such as person-person connections 406-A and 406-B). Example visual representations for person-topic connections are also shown in FIGS. 4A and 4B, such as person-topic connections 408-A and 408-B).

In some implementations, a line width of a respective visual representation corresponds to similarity scores (e.g., thicker lines for stronger/more similar connections). In some implementations, visual representations of each connection in the first set of connections are displayed in a visually distinct manner within the interactive visualization relative to visual representations of each connection in the second set of connections. For example, connections between persons and topics are in a first color (e.g., grey) and additional connections between persons and other persons (co-authors) are displayed in a second color that is distinct from the first color (e.g., purple).

In some implementations, updating the interactive visualization to include a visual representation of a respective connection in the first set of connections includes, in accordance with a determination that an assigned person-topic similarity score that is associated with the respective connection satisfies a person-topic similarity threshold, updating the interactive visualization to include the visual representation of the respective connection. In some implementations, updating the interactive visualization to include a visual representation of a respective connection in the second set of connections includes, in accordance with a determination that an assigned person-person similarity score that is associated with the respective connection satisfies a person-person similarity threshold, updating the interactive visualization to include the visual representation of the respective connection. In this way, only relevant enough (i.e., exceeding the appropriate thresholds) connections are included in the visualization, so that irrelevant connections are not cluttering up the interactive visualization.

In some implementations, the obtaining, displaying, and updating steps (710-720) are all performed in response to receiving the user selection of the specified time period.

In some implementations, the displayed interactive visualization further includes: a respective burst activity indication for each topic of the set of topics. The respective burst activity indication for a respective topic provides a visual representation showing a number of documents (or a number of people) that are associated with the respective topic during the specified time period. For example and as discussed above in reference to FIGS. 6A-6B, burst detection is computed for each topic of the predefined number of topics (e.g., for each topic of the predefined number of topics, a number of relevant documents is found for each time point to generate an activity stream). A burst detection algorithm is then applied to the activity stream of each topic and, for each time point of a topic, a burst level is assigned (e.g., 0, 1, 2, 3). In some implementations, the burst levels are mapped to different "heat" colors in the interactive visualization (e.g., 0:green, 1:yellow, 2:orange, 3:red, as shown for respective topic nodes in FIGS. 4A-4B and 5A-5C). In some implementations, a burst is defined as a topic having more than a threshold amount of associated documents/persons for a particular time period.

In some implementations, the device receives a new user selection, via the one or more input devices, to display the interactive visualization for a new time period, distinct from the specified time period (e.g., received based on user input at a timeline slider, such as timeline slider 422, FIGS. 4A and 4C). In response to receiving the new request, the device determines that a respective connection in the first set of connections is associated with an updated person-topic similarity score that is specific to the new time period. The updated person-topic similarity score is distinct from a respective person-topic similarity score that is associated with the respective connection during the specified time period (i.e., the updated relevance score is either greater than or less than the originally-computed similarity score, indicating that the interactive visualization should be updated to reflect this change). The device also moves a respective second user interface element to a new position on the display and updating a respective visual representation of the respective connection based on the new position. For example, in accordance with a determination that the updated similarity score is greater than the originally-computed similarity score, then the respective second user interface element is moved closer to the first user interface element for the topic. And, in accordance with a determination that the updated similarity score is less than the originally-computed similarity score, then the respective second user interface element is moved further away from the first user interface element for the topic. In some implementations, if the updated person-topic similarity score is below a score threshold (for implementations using an LDA-based model to determine similarity scores), then the interactive visualization is updated to remove a second user interface corresponding to the respective person (i.e., because the connection between this person and the topic is no longer relevant enough during the new time period selected by the user).

In some implementations, updating the interactive visualization does not include modifying display positions for the first user interface elements corresponding to each topic in the set of topics. In other words, nodes for the topics (first user interface elements) are fixed and thus do not move in the visualization, even as nodes corresponding to persons (second user interface elements) do move.

In some implementations, the device receives a user selection of a respective second user interface element that is associated with a respective person of the plurality of persons and, in response to receiving the user selection, the device displays links to collaboration data that is associated with the respective person. In some implementations, this allows users to quickly access documents associated with particular authors, even though the interactive visualization does not display the documents directly in the visualization.

It should be understood that the particular order in which the operations in FIG. 7 have been described is merely exemplary and is not intended to indicate that the described order is the only order in which the operations could be performed. One of ordinary skill in the art would recognize various ways to reorder the operations described herein.

FIGS. 8A-8D provide analytical charts that demonstrate performance of the systems and methods disclosed herein for presenting interactive visualizations of collaboration data, in accordance with some implementations. In one experiment, visualizations were tested using two datasets: (1) a public dataset from Info Vis (Fekete, J.-D., Grinstein, G., Plaisant, C., IEEE InfoVis 2004 Contest, the history of InfoVis, which is hereby incorporated by reference in its entirety), extended from 8 to 20 years; and (2) metadata from FXPAL database for publications over 21 years. The dimension of the vector spaces V for the Info Vis data is 8252, and for the FXPAL data is 5626. m=10 is used for the number of highest probability components, so the dimension of subspace Vc subspace is ≤10 k, where k is the number of topics. In tests with k=5, 10, 20, the dimension of Vis is reduced by a factor of about 30 to 160.

Sizes of the node-link graphs are examined for different number of topics (k=5, 10, 20), and for various relevance scores (cosine similarity). Total numbers of Person nodes (p-nodes) and edges (person-person and person-topic connections) for different numbers k of topics are shown in Table 1 below.

TABLE 1

Number of Person nodes (p-nodes) and edges.

|  | p-nodes, k = 5 | edges, k = 5 | p-nodes, k = 10 | edges, k = 10 | p-nodes, k = 20 | edges, k = 20 |
| --- | --- | --- | --- | --- | --- | --- |
| InfoVis | 1073 | 3584 | 1075 | 3699 | 1075 | 3770 |
| FXPAL | 292 | 1649 | 302 | 1759 | 302 | 1850 |

The number of persons in the Info Vis data is 1075, and in the FXPAL data is 306. By looking at the p-nodes in Table 1, the space of persons (and documents) is well covered. With the Info Vis data, when k=20 all 1075 p-nodes are covered, and when k=5, only 2 p-nodes are missed. With the FXPAL data, when k=20, just 4 of 302 p-nodes are missed.

The missing nodes occur when the person's documents are not in the subspace Vc (discussed above in reference to FIGS. 6A-6B). Having good coverage or recall of the p-nodes is important so that parts of the data do not become inaccessible in the visualization, and the coverage is good by the topics and the subspace Vc under the dimension reduction. In contrast, a more simplistic approach such as taking the top k keywords would provide very poor coverage.

Figure 8B:
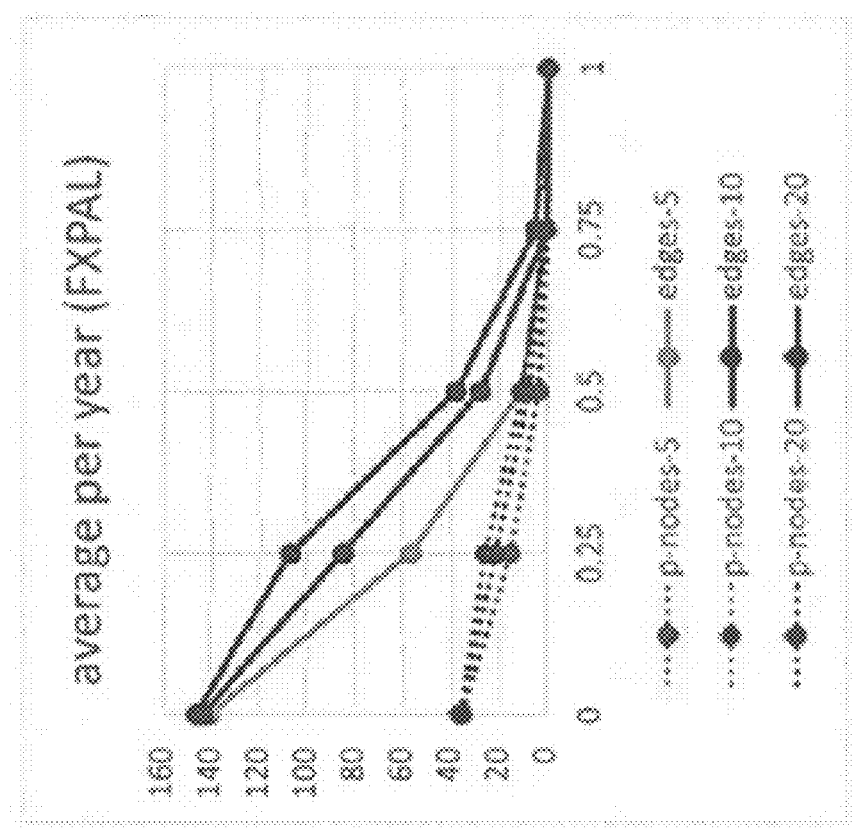
FIGS. 8A-8D provide analytical charts that demonstrate performance of the systems and methods disclosed herein for presenting interactive visualizations of collaboration data, in accordance with some implementations.
Figure 8A:
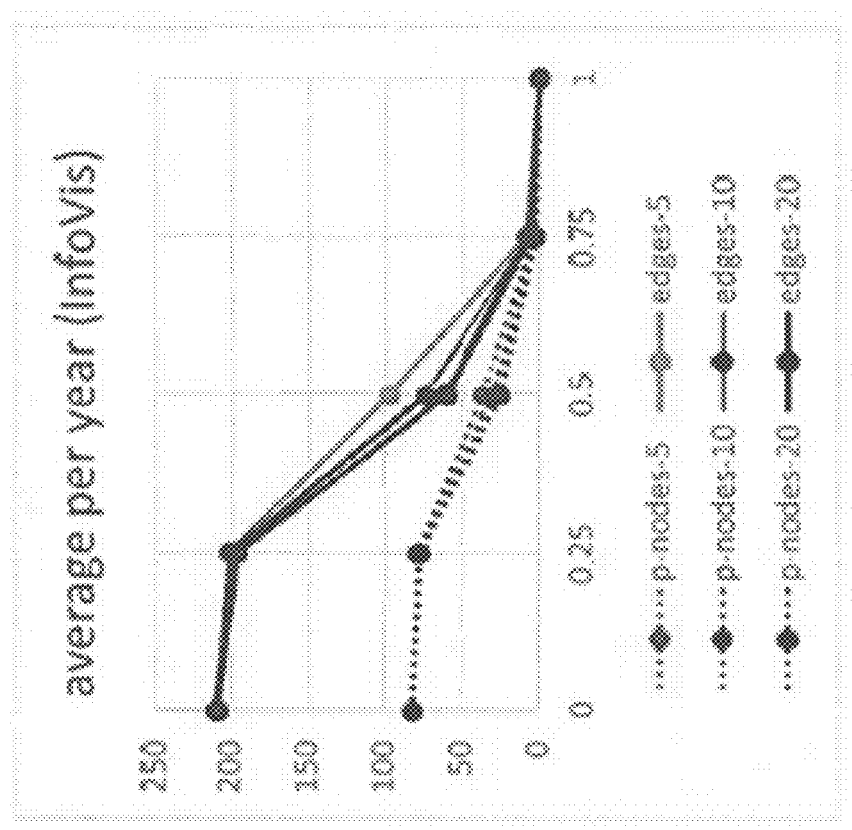
Figures 8C, 8D:
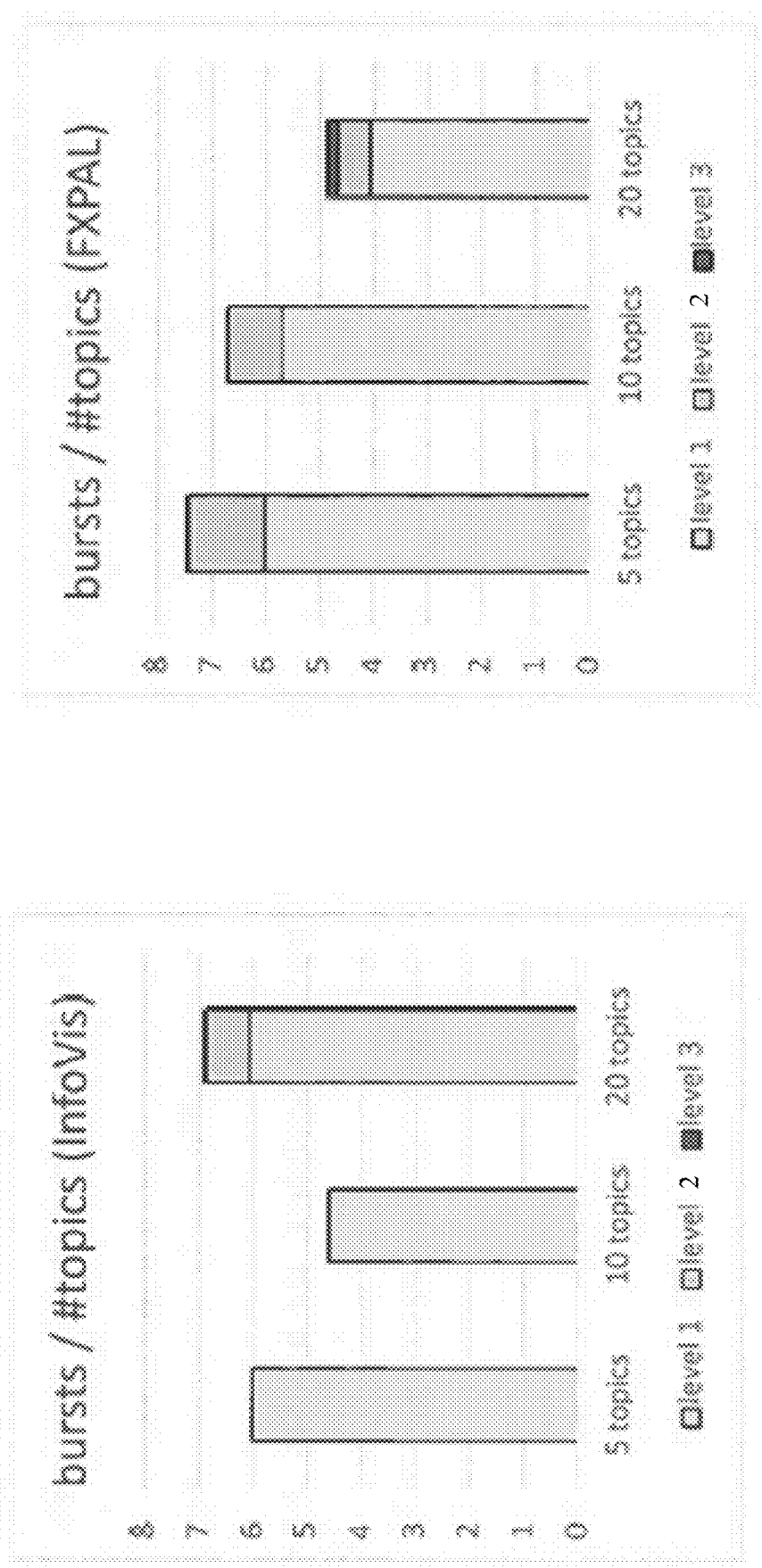

Total numbers of nodes and edges can be large (see Table 1), which leads to clutter in visualizations. The nodes and edges can be filtered by varying the relevance score threshold so that only the more relevant objects are displayed. FIGS. 8A-8B show the number of p-nodes and edges retrieved with different relevance thresholds. FIGS. 8C-8D show that there are roughly 5 to 7 bursts over the 20 year periods (k=5, 10, 20). For the Info Vis data, level 1 bursts occur only at k=20, and for the FXPAL data, level 2 bursts occur only at k=20. One possible explanation is that the topics are more diverse in the FXPAL data in contrast to Info Vis which is a conference focused on a single research area, and topics also become more diverse when there are more of them at higher k values.

Although the terms "first," "second," etc. may be used herein to describe various elements, these elements should not be limited by these terms. These terms are only used to distinguish one element from another. For example, a first contact could be termed a second contact, and, similarly, a second contact could be termed a first contact, which changing the meaning of the description, so long as all occurrences of the "first contact" are renamed consistently and all occurrences of the second contact are renamed consistently. The first contact and the second contact are both contacts, but they are not the same contact.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. The term "and/or" as used herein refers to and encompasses any and all possible combinations of one or more of the associated listed items. The terms "comprises" and/or "comprising," when used in this specification, specify the presence of stated features, steps, operations, elements, and/or components, but do not preclude the presence or addition of one or more other features, steps, operations, elements, components, and/or groups thereof.

The foregoing description, for purpose of explanation, has been described with reference to specific implementations. However, the illustrative discussions above are not intended to be exhaustive or to limit the invention to the precise forms disclosed. Many modifications and variations are possible in view of the above teachings. The implementations were chosen and described in order to best explain the principles of the invention and its practical applications, to thereby enable others skilled in the art to best utilize the invention and various implementations with various modifications as are suited to the particular use contemplated.

What is claimed is:

1. A method of presenting a topic-centric visualization of collaboration data that is associated with a plurality of persons, comprising:
    at a computing device with a display, one or more input devices, one or more processors, and memory storing one or more programs configured for execution by the one or more processors:
        obtaining a set of topics based on an analysis of the collaboration data, wherein the collaboration data indicates co-authorship in a collection of documents;
        displaying, on the display, an interactive visualization that includes first user interface elements that correspond to each topic in the set of topics, wherein the first user interface elements are positioned on the display such that first user interface elements corresponding to similar topics are close together;
        receiving, via the one or more input devices, a user selection of a specified time period for the interactive visualization;
        in response to receiving the user selection of the specified time period, identifying a subset of the plurality of persons that are associated with the specified time period;
        obtaining (a) a first set of connections between the set of topics and the subset of the plurality of persons, wherein each connection in the first set of connections is associated with a person-topic similarity score that indicates similarity of a respective person of the subset of the plurality of persons to a respective topic in the set of topics during the specified time period and (b) a second set of connections between related persons in the subset of the plurality of persons, wherein each connection in the second set of connections is associated with a person-person similarity score that indicates similarity, based on co-authorship in the collection of documents for the specified time period, of a respective related person of the related persons to a different respective related person of the related persons during the specified time period;
        displaying second user interface elements, including a respective second user interface element, that correspond to each person in the subset of the plurality of persons;
        for each connection in the first set of connections and the second set of connections, updating the interactive visualization to include a visual representation of the connection;
        receiving a new user selection, via the one or more input devices, to display an interactive visualization for a new time period, distinct from the specified time period;
        in response to receiving the new user selection, determining that a respective connection in the first set of connections is associated with an updated person-topic similarity score that is specific to the new time period, wherein the updated person-topic similarity score is distinct from a respective person-topic similarity score that is associated with the respective connection during the specified time period; and
        replacing the interactive visualization for the specified time period with the interactive visualization for the new time period, including:
            moving the respective second user interface element of the displayed second user interface elements to a new position on the display in accordance with the updated person-topic similarity score so as to position the respective second user interface element nearer to similar topics and similar persons based on co-authorship in the collection of documents for the new time period; and
            updating a respective visual representation of the respective connection based on the new position.

2. The method of claim 1, wherein the set of topics are identified based on an analysis of information about the collaboration data, and further wherein the collaboration data is not displayed in the interactive visualization.

3. The method of claim 1, wherein the displayed interactive visualization further includes:
 a respective burst activity indication for each topic of the set of topics, wherein the respective burst activity indication for a respective topic provides a visual representation of an intensity level of document creation that is associated with the respective topic during the specified time period.

4. The method of claim 1, wherein a respective first user interface element for a respective topic is displayed with: (i) an identifier and (ii) a predefined number of topic component terms that are associated with the respective topic.

5. The method of claim 4, wherein the identifier is an editable field and the method further comprises:
 detecting a selection of the identifier for the respective first user interface element; and
 in response to detecting the selection of the identifier, allowing a user to input a descriptive name for the respective topic.

6. The method of claim 1, wherein updating the interactive visualization does not include modifying display positions for the first user interface elements corresponding to each topic in the set of topics.

7. The method of claim 1, wherein the new user selection to display the interactive visualization for the new time period is received at a slide-able user interface element.

8. The method of claim 1, wherein the collaboration data includes freely-available metadata about a plurality of documents.

9. The method of claim 8, wherein the freely-available metadata about the plurality of documents includes, for a respective document of the plurality of documents, author information, a document abstract, a date of publication, a document title, and metadata keywords.

10. The method of claim 1, wherein the plurality of persons are authors of a plurality of documents included in the collaboration data and each connection in the second set of connections between related persons indicates a relationship between co-authors.

11. The method of claim 10, wherein visual representations of each connection in the first set of connections are displayed in a visually distinct manner within the interactive visualization relative to visual representations of each connection in the second set of connections.

12. The method of claim 1, further comprising, receiving a user selection of the respective second user interface element and, in response to receiving the user selection, displaying links to collaboration data that is associated with the respective person.

13. The method of claim 1, wherein the person-topic similarity scores are computed based on the output of an LDA-based model.

14. The method of claim 13, wherein the respective second user interface element is displayed in accordance with a determination that at least one assigned person-topic similarity score that is associated with the respective person satisfies a person-topic similarity threshold.

15. The method of claim 13, wherein updating the interactive visualization to include a visual representation of a respective connection in the first set of connections includes, in accordance with a determination that an assigned person-topic similarity score that is associated with the respective connection satisfies a person-topic similarity threshold, updating the interactive visualization to include the visual representation of the respective connection.

16. The method of claim 13, wherein updating the interactive visualization to include a visual representation of a respective connection in the second set of connections includes, in accordance with a determination that an assigned person-person similarity score that is associated with the respective connection satisfies a person-person similarity threshold, updating the interactive visualization to include the visual representation of the respective connection.

17. The method of claim 1, wherein the respective second user interface element is positioned on the display based on person-topic and person-person similarity scores that are associated with the respective second user interface element.

18. A non-transitory computer-readable storage medium, storing one or more programs configured for execution by one or more processors of a computing device with a display and one or more input devices, the one or more programs comprising instructions for:
 obtaining a set of topics based on an analysis of collaboration data associated with a plurality of persons, wherein the collaboration data indicates co-authorship in a collection of documents;
 displaying, on the display, an interactive visualization that includes first user interface elements that correspond to each topic in the set of topics, wherein the first user interface elements are positioned on the display such that first user interface elements corresponding to similar topics are close together;
 receiving, via the one or more input devices, a user selection of a specified time period for the interactive visualization;
 in response to receiving the user selection of the specified time period, identifying a subset of the plurality of persons that are associated with the specified time period;
 obtaining (a) a first set of connections between the set of topics and the subset of the plurality of persons, wherein each connection in the first set of connections is associated with a person-topic similarity score that indicates similarity, based on co-authorship in the collection of documents for the specified time period, of a respective person of the subset of the plurality of persons to a respective topic in the set of topics during the specified time period and (b) a second set of connections between related persons in the subset of the plurality of persons, wherein each connection in the second set of connections is associated with a person-person similarity score that indicates similarity of a respective related person of the related persons to a different respective related person of the related persons during the specified time period;
 displaying second user interface elements, including a respective second user interface element, that correspond to each person in the subset of the plurality of persons;
 for each connection in the first set of connections and the second set of connections, updating the interactive visualization to include a visual representation of the connection;
 receiving a new user selection, via the one or more input devices, to display an interactive visualization for a new time period, distinct from the specified time period;
 in response to receiving the new user selection, determining that a respective connection in the first set of connections is associated with an updated person-topic similarity score that is specific to the new time period, wherein the updated person-topic similarity score is distinct from a respective person-topic similarity score that is associated with the respective connection during the specified time period; and replacing the interactive visualization for the specified time period with the interactive visualization for the new time period, including:

moving the respective second user interface element of the displayed second user interface elements to a new position on the display in accordance with the updated person-topic similarity score so as to position the respective second user interface element nearer to similar topics and similar persons based on co-authorship in the collection of documents for the new time period; and updating a respective visual representation of the respective connection based on the new position.

19. A computing device, comprising:

a display;

one or more input devices;

one or more processors; and memory storing one or more programs which, when executed by the one or more processors, cause the computing device to:

obtain a set of topics based on an analysis of collaboration data associated with a plurality of persons, wherein the collaboration data indicates co-authorship in a collection of documents;

display, on the display, an interactive visualization that includes first user interface elements that correspond to each topic in the set of topics, wherein the first user interface elements are positioned on the display such that first user interface elements corresponding to similar topics are close together;

receive, via the one or more input devices, a user selection of a specified time period for the interactive visualization;

in response to receiving the user selection of the specified time period, identify a subset of the plurality of persons that are associated with the specified time period;

obtain (a) a first set of connections between the set of topics and the subset of the plurality of persons, wherein each connection in the first set of connections is associated with a person-topic similarity score that indicates similarity, based on co-authorship in the collection of documents for the specified time period, of a respective person of the subset of the plurality of persons to a respective topic in the set of topics during the specified time period and (b) a second set of connections between related persons in the subset of the plurality of persons, wherein each connection in the second set of connections is associated with a person-person similarity score that indicates similarity of a respective related person of the related persons to a different respective related person of the related persons during the specified time period; and display second user interface elements, including a respective second user interface element, that correspond to each person in the subset of the plurality of persons; and for each connection in the first set of connections and the second set of connections, update the interactive visualization to include a visual representation of the connection;

receive a new user selection, via the one or more input devices, to display an interactive visualization for a new time period, distinct from the specified time period;

in response to receiving the new user selection, determine that a respective connection in the first set of connections is associated with an updated person-topic similarity score that is specific to the new time period, wherein the updated person-topic similarity score is distinct from a respective person-topic similarity score that is associated with the respective connection during the specified time period; and replace the interactive visualization for the specified time period with the interactive visualization for the new time period, including:

moving the respective second user interface element of the displayed second user interface elements to a new position on the display in accordance with the updated person-topic similarity score so as to position the respective second user interface element nearer to similar topics and similar persons based on co-authorship in the collection of documents for the new time period; and updating a respective visual representation of the respective connection based on the new position.

* * * * *